US011438763B2

(12) United States Patent
Ramachandran et al.

(10) Patent No.: US 11,438,763 B2
(45) Date of Patent: Sep. 6, 2022

(54) SYSTEM AND METHOD FOR IMPROVING NETWORK PERFORMANCE WHEN USING SECURE DNS ACCESS SCHEMES

(71) Applicant: HUGHES NETWORK SYSTEMS, LLC, Germantown, MD (US)

(72) Inventors: Ganeshan Ramachandran, Germantown, MD (US); Robert Torres, Germantown, MD (US); George Choquette, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 344 days.

(21) Appl. No.: 16/583,004

(22) Filed: Sep. 25, 2019

(65) Prior Publication Data
US 2021/0092595 A1    Mar. 25, 2021

(51) Int. Cl.
*H04L 29/06* (2006.01)
*H04W 12/037* (2021.01)
*H04L 61/4511* (2022.01)
*H04L 9/40* (2022.01)
*H04L 12/18* (2006.01)
*H04B 7/185* (2006.01)

(52) U.S. Cl.
CPC ...... *H04W 12/037* (2021.01); *H04B 7/18526* (2013.01); *H04B 7/18593* (2013.01); *H04L 12/1881* (2013.01); *H04L 61/1511* (2013.01); *H04L 63/0428* (2013.01)

(58) Field of Classification Search
CPC ............. H04W 12/037; H04B 7/18526; H04B 7/18593; H04L 12/1881; H04L 61/1511; H04L 63/0428

USPC ......................................................... 713/151
See application file for complete search history.

(56) References Cited

U.S. PATENT DOCUMENTS 8,549,148 B2   10/2013   Devarapalli et al.
9,660,998 B1    5/2017   Sethi
(Continued)

FOREIGN PATENT DOCUMENTS

WO    2012/061243 A1    5/2012

OTHER PUBLICATIONS

Jin, "A Client Based DNSSEC Validation Mechanism with Recursive DNS Server Separation", 2018, IEEE, pp. 148-153, (Year: 2018).*

(Continued)

*Primary Examiner* — Taghi T Arani
*Assistant Examiner* — Gregory A Lane
(74) *Attorney, Agent, or Firm* — Potomac Technology Law, LLC

(57) ABSTRACT

A process for improving network performance in systems that utilize secure domain name system (DNS) schemes. Encrypted DNS requests from devices in a local area network (LAN), such as a home or office, are submitted to a local proxy which stores cached DNS records. The proxy decrypts or examines at least a portion of the DNS request in order search for a matching record in its storage. Matching records are retrieved, encrypted, and supplied to the requesting device to satisfy the DNS request. If the proxy does not contain a matching record, the DNS query is encrypted and submitted to an external DNS server for resolution. The matching record can optionally be saved by the proxy prior to being supplied to the requesting device.

45 Claims, 16 Drawing Sheets

(56) References Cited

U.S. PATENT DOCUMENTS

| | | |
|---|---|---|
| 10,033,692 B1* | 7/2018 | Vavrusa ............... H04L 61/6013 |
| 2003/0172183 A1 | 9/2003 | Anderson et al. |
| 2004/0073707 A1* | 4/2004 | Dillon ............... H04L 29/12066 |
| | | 709/245 |
| 2005/0259645 A1 | 11/2005 | Chen et al. |
| 2014/0304414 A1* | 10/2014 | Yengalasetti ....... H04L 67/1036 |
| | | 709/226 |
| 2018/0075037 A1* | 3/2018 | Nanavati ........... G06F 16/24578 |
| 2019/0215166 A1 | 7/2019 | Prince et al. |

OTHER PUBLICATIONS

International Search Report and Written Opinion issued in PCT/US2020/052427, dated Feb. 8, 2021.
International Search Report and Written Opinion issued in PCT/US2020/060445, dated Feb. 12, 2021.

* cited by examiner

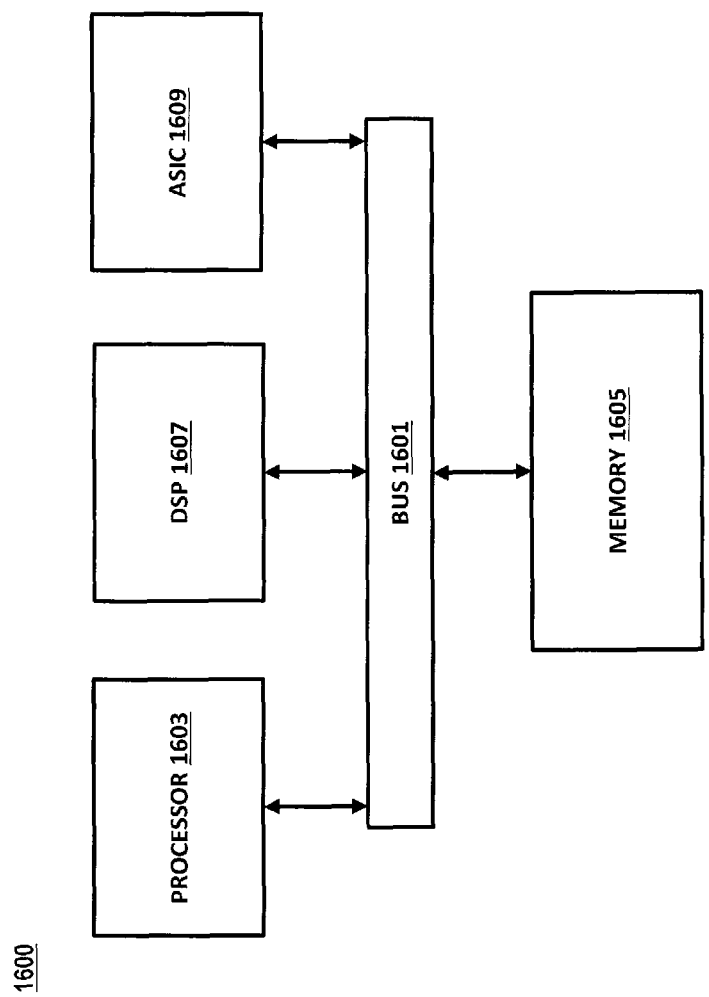

SYSTEM AND METHOD FOR IMPROVING NETWORK PERFORMANCE WHEN USING SECURE DNS ACCESS SCHEMES

BACKGROUND INFORMATION

The packet switched networks are increasingly used by voice and data communication systems. Such networks include private networks accessible only to authorized personnel. Packet switched networks also include public networks, such as the internet, which are accessible to consumers via providers such as an internet service provider (ISP), wireless (cellular) service provider, etc. For example, many consumers interact with news-oriented websites in order to obtain information such as current events, sports, weather, traffic, etc. using a web browser operating on devices capable of accessing the internet. Consumers also interact with recreational websites in order to access social media, music streaming services, video streaming services, etc.

Consumers typically enter a request for a web address in the web browser in order to establish a communication link with the desired website. The request often includes, in part, information related to the website such as a business name, service name, etc. (e.g., "www.businessname.com"). With the exception of consumer devices, however, website locations are identified and accessed using numeric internet protocol (IP) addresses. In order to access a particular website, the web address supplied by the consumer must be matched to, or translated into, its actual IP address. The web browser transparently performs this task by submitting a domain name system (DNS) request for (web) address translation to an external entity. For example, DNS servers (or authoritative DNS servers) function as entities which store and maintain information to the relationship between web addresses and IP addresses. The DNS server examines the web address contained in the request for address translation, and returns a matching IP address to the web browser. The web browser subsequently utilizes the IP address to establish a connection, thus allowing the consumer to access the desired information. Depending on the particular website, the IP address may expire and/or change. Accordingly, it is necessary to obtain the current (and valid) IP address from the DNS server in order to access the web site.

While the use of DNS requests has allowed consumers to access websites using names that can be easily remembered due to their relationship with established brands and/or services, they have also opened security breaches that can be exploited by third parties. For example, DNS requests can be intercepted by third parties who supply a false IP address to the web browser or user device. When a connection is established, malicious software can be installed on the user device in order to access personal and/or security information. Various techniques, such as encryption, have been proposed to address some of these vulnerabilities. For example, security protocols have been proposed to encrypt information contained with request for DNS resolution, and response from the DNS server.

Certain wireless communication systems, such as satellite communication system, implement caching clients within satellite terminals deployed at consumer locations and/or satellite gateways. The caching clients function to reduce latency associated with transmission to/from the satellite. For example, a caching client can be configured to store copies of IP addresses associated with DNS requests. When a DNS request is received at the satellite terminal, the caching client supplies a stored IP address to the user device. Thus, the latency associated with transmission of the DNS request to/from the satellite and subsequently to the DNS server can be eliminated.

Secure DNS protocols can potentially preclude the use of caching clients, because if the information contained in the DNS request is encrypted and cannot be accessed by the caching client. All requests for DNS address translation would need to be transmitted to the DNS server over the satellite link, thereby adding delay to the consumer's connection to the website and overall experience. Considering the number of foreground and background requests continually submitted by applications such as web browsers, significant latency may be experienced.

Based on the foregoing, there is a need for an approach for implementing caching techniques that can be used with secure DNS protocols without the need to communicate with the DNS server for each request.

BRIEF SUMMARY

An apparatus, method, and system are disclosed for improving network performance when using secure DNS access schemes. According to an embodiment, the method includes: receiving a domain name system (DNS) query at a secure DNS proxy (SDP) of a satellite communication system, the DNS query being encrypted using a predetermined security protocol; decrypting the DNS query; determining if a non-expired record exists for the DNS query in a storage of the SDP; supplying an encrypted copy of the record from the SDP storage in response to the received query, if the record is not expired; encrypting the DNS query; submitting the encrypted DNS query to an authoritative DNS server via a public network, if the record is expired or does not exist in the storage of the SDP; receiving an encrypted authoritative record in response to the submitted DNS query; decrypting the authoritative record; applying the predetermined security protocol to encrypt the authoritative record; and supplying the authoritative record, encrypted with the predetermined security protocol, in response to the received DNS query.

According to another embodiment, the method includes: receiving a domain name system (DNS) query at a secure DNS proxy (SDP) client of a satellite communication system, the DNS query being encrypted using a predetermined security protocol; decrypting the DNS query; determining if a non-expired client record exists for the DNS query in a storage of the SDP client; supplying an encrypted copy of the client record from the storage of the SDP client in response to the received query, if the client record is not expired; forwarding the DNS query to an SDP server located in a gateway of the satellite communication system, if the client record is expired or does not exist in a storage of the SDP client; determining if a non-expired server record exists for the DNS query in a storage of the SDP server; supplying an encrypted copy of the server record from the storage of the SDP server in response to the received query, if the server record is not expired; encrypting and submitting the DNS query to an authoritative DNS server via a public network, if the server record is expired or does not exist in the SDP server; receiving an encrypted authoritative record in response to the submitted DNS query; decrypting the authoritative record; applying the predetermined security protocol to encrypt the authoritative record; and supplying the authoritative record, encrypted with the predetermined security protocol, in response to the received DNS query.

According to another embodiment, the method includes: receiving a domain name system (DNS) query at a secure DNS proxy (SDP) client of a satellite communication system, the SDP client being domain name system security extensions (DNSSEC) aware; determining if a non-expired client record exists for the DNS query in a storage of the SDP client, the client record being digitally signed; supplying the client record from the SDP client in response to the received query, if the client record is not expired; forwarding the DNS query to an SDP server located in a gateway of the satellite communication system, if the client record is expired or does not exist in the SDP client, the SDP server being DNSSEC-aware; determining if a non-expired server record exists for the DNS query in a storage of the SDP server, the server record being digitally signed; supplying the server record from the storage of the SDP server in response to the received query, if the server record is not expired; submitting the DNS query to an authoritative DNS server via a public network, if the server record is expired or does not exist in the SDP server; receiving an authoritative record digitally signed by the authoritative DNS server in response to the submitted DNS query; verifying at least a source and/or authenticity of the authoritative record; and supplying the authoritative record in response to the received DNS query based, at least in part, on the verifying.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 16 is a diagram of a chip set that can be used to implement various exemplary features and embodiments.

DETAILED DESCRIPTION

An apparatus, method, and system for improving network access when using secure DNS access schemes, is described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
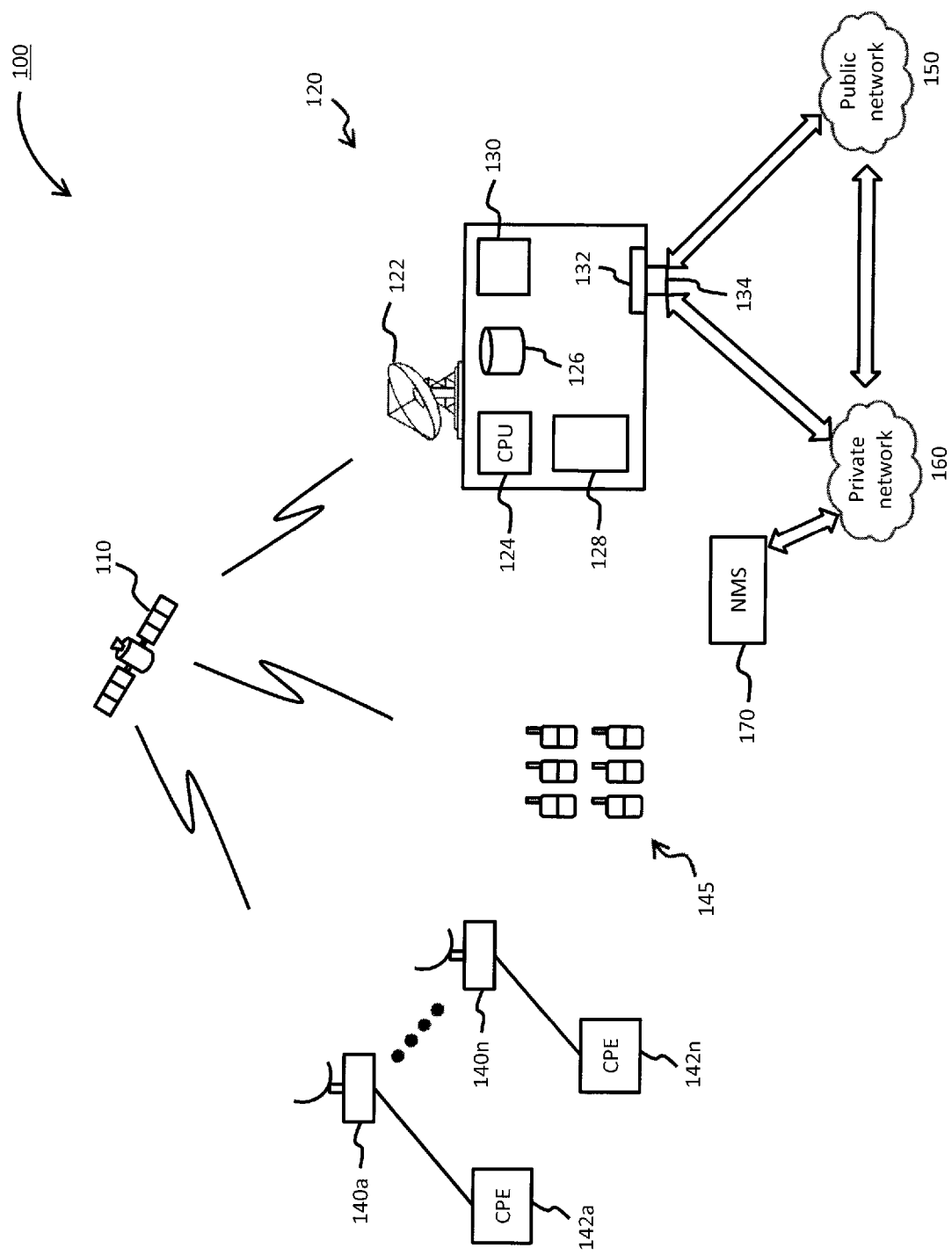
FIG. 1 is a diagram of a satellite communication system capable of voice and data services, according to one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each stationary satellite terminal (or terminal) 140 can be configured for relaying traffic between its customer premise equipment (CPEs) 142a-142n, a public network 150 such as the internet, and/or its private network 160. According to an exemplary embodiment, the terminals 140 can be in the form of very small aperture terminals (VSATs) that are mounted on a structure, habitat, etc. The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). As used herein, a transceiver corresponds to any type of antenna unit used to transmit and receive signals, a transmitter, a receiver, etc. The RFT is useable to transmit and receive signals within a communication system such as the satellite communication system 100 illustrated in FIG. 1. The data storage unit 126 can be used, for example, to store and provide access to information pertaining to various operations in the satellite communication system 100. According to other embodiments, the gateway 120 can include multiple processing units 124 and multiple data storage units 126 in order to accommodate the needs of a particular system implementation. The data storage unit 126 (or storage unit) can be configured, for example, as a single drive, multiple drives, an array of drives configured to operate as a single drive, etc. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
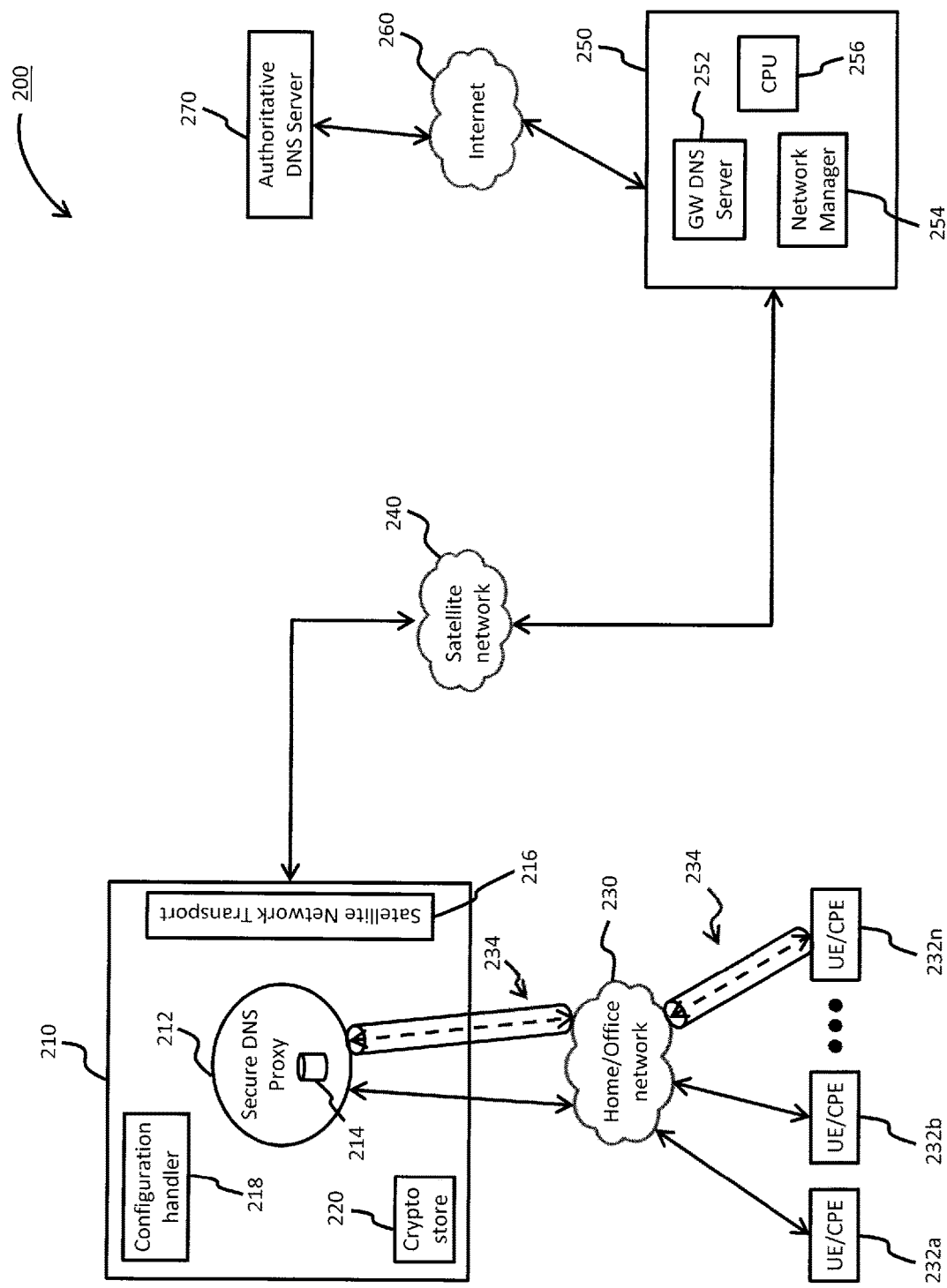
FIG. 2 is a diagram of a system for improving network performance using a secure DNS proxy, according to at least one embodiment.

FIG. 2 illustrates a system 200 for improving performance when applying secure DNS access schemes. The system 200 includes a terminal 210 configured to establish communication with a gateway 250 via a satellite network 240, and exchange various types of information. The information exchanged between the terminal and the gateway can include, without limitation, voice, data, control signals, etc. According to the illustrated embodiment, the terminal 210 includes a secure DNS proxy 212 (SDP), a satellite network transport unit 216, a configuration handler 218, and a crypto store 220. Although not illustrated in FIG. 2, the terminal 210 can further include one or more processing units configured to control and/or assist in performing various operations. Furthermore, components such as the SDP 212, satellite network transport 216, configuration handler 218, and crypto store 220 can also incorporate processing units and/or co-processors in order to perform various tasks, as will be described in greater details below.

According to at least one embodiment, the SDP 212 is configured to monitor, process, and/or improve DNS search performance. As illustrated in FIG. 2, the SDP 212 further includes a storage unit 214 capable of storing information usable for processing and/or resolving various requests for domain name resolution (i.e., DNS requests). Depending on the specific implementation, the storage unit 214 can be in the form of various combinations of hardware and software designed to optimize storage and retrieval of information. For example, the storage unit 214 can be in the form of a solid-state storage device, standard non-volatile memory, high performance cache storage, etc.

The satellite network transport unit 216 is configured to provide transport path between the terminal 210 and the Gateway 250. Although not illustrated in FIG. 2, the satellite network transport unit 216 can include a combination of hardware and/software components which interact to facilitate the transport path between the terminals 210 and the gateway 250. According to various embodiments, the satellite network transport unit 216 can be configured to optimize information exchange over the satellite link. For example, the satellite network transport unit 216 can implement performance enhancing proxies (PEP) to improve transmission efficiency. Depending on the specific implementation, various PEP techniques can be used to transmit information over the satellite link instead of conventional TCP/IP packets.

The configuration handler 218 includes various components (not shown), implemented as hardware and/or software combinations that interact with the terminal 210 and gateway 250 to provide necessary configuration information necessary. According to at least one embodiment, the configuration handler 218 can be configured to provide secure DNS proxy functionality by supplying configuration parameters for secure transport modes (e.g., HTTPS, TLS, DTLS, etc.), X.509 certificates and the associated private key, connection reuse parameters, timers, etc. Furthermore, while the network management traffic might be carried over an encrypted satellite link, the configuration hander 218 can apply additional layers of protection while transferring private keys and any sensitive encryption-related.

According to the illustrated embodiment, the crypto store 220 can be configured as a storage unit which holds sensitive authentication and encryption related configuration information such as X.509 certificates, private keys, etc. The secure crypto store 220 can configured to implement various mechanisms (e.g., hardware, software, or both) for ensuring that encryption information is only accessible by authorized entities. The secure crypto store 220 can be further configured to monitor and track access to any information contained therein. According to an embodiment, any attempted tampering or malicious access to the encryption information contained in the crypto store 220 will result in automatic shutdown of the SDP 212 and/or terminal 210. The terminal 210 (or any of the components therein) can inform the gateway 250 and/or network manager 254 so that all DNS requests from customer premise equipment (CPE) 232a-232n (collectively 232) will be transparently relayed to the gateway DNS server 252 or an upstream DNS server such as the authoritative DNS server 270. As illustrated in FIG. 2, communication between the gateway 250 and the authoritative DNS server 270 can occur using a public network such as the internet 260. According to various embodiments, however, a private network or combination of public/private networks can be used to establish an end-to-end communication link between the gateway 250 and the authoritative DNS server 270.

According to at least one embodiment, the terminal 210 can perform various functions associated with connecting the CPEs 232 to the gateway 250 for subsequent access to private networks or a public network such as the internet 260. For example, the terminal 210 can interconnect a plurality of CPEs 232 via a home or office network 230. Although FIG. 2 illustrates the home network 230 as a separate component, various embodiments of the terminal 210 can incorporate routing, switching, and other networking functions internally. For example, the terminal 210 can incorporate multiple ethernet ports for establishing a wired connection to various CPEs 232. The terminal 210 can further incorporate wireless transceivers (not shown) for establishing wireless communication links with certain types of CPEs 232 such as mobile phones, tablets, notebooks, etc.

According to at least one embodiment, a tunneling protocol can be used to establish a tunnel 234 between CPE 232*n* and the terminal 210. Thus, DNS queries from CPE 232*n* can be injected into the tunnel 234 towards the terminal 210. DNS responses (or records) from the terminal 210 can be injected into the tunnel 234 towards CPE 232*n*. Depending on the specific implementation, CPE 232*n* may be configured to utilize a tunneling protocol which terminates at the terminal 210. The terminal 210 would subsequently re-tunnel the interaction to the gateway 250 after applying network specific optimization techniques. When such configurations are used, and if the CPE 232*n* is configured to use the SDP 212 for DNS resolution, then all DNS queries from the tunnel 234 will be diverted to the SDP 212. The SDP 212 would supply all records to the CPE 232*n* over the same tunnel 234. The record can be from the SDP's storage unit 214, the gateway DNS server 252, or the authoritative DNS server 270.

As previously discussed, the terminal 210 facilitates communication between the CPE 232 and various public and private networks such as the internet 260. More particularly, the terminal 210 transmits and receives traffic to/from the gateway 250 using the satellite network 240. The gateway 250 subsequently forwards user traffic to/from the external network 260. According to various embodiments, all traffic over the satellite network 200 is encrypted using predetermined security protocols in order to minimize and/or eliminate data access by unauthorized parties. The encryption can be applied at different layers (e.g., layer 2, layer 3, etc.), depending on the specific implementation.

As illustrated in FIG. 2, the gateway 250 can include a gateway DNS server 252, a network manager 254, and one or more CPU 256. It should be noted, however, that the gateway 250 can be optionally configured to operate without the gateway DNS server 252. According to one or more embodiments, the CPU 256 can be configured to provide some or all of the functionality of the components within the gateway 250. According to other embodiments, the CPU 256 can be configured to supplement operation of other components within the gateway 250 by allocating excess computational resources, when available. The gateway 250 can further include various hardware and software components (not shown) necessary to facilitate normal operations. For example, the gateway 250 can include a radio frequency transceiver for transmitting and receiving information over the satellite network 240. The gateway 250 can further include one or more interfaces for establishing connections to various internal components, as well as terrestrial network connections. The terrestrial connections can facilitate, for example, communication between the gateway 250 and an authoritative DNS server 270 via the external network 260. According to various embodiments, the network manager 254 can be configured to generate and distribute configuration information and/or profiles to various components (e.g., terminals, CPEs, etc.) in the system 200. For example, the network manager 254 can Implement special procedures to facilitate secure transfer of private keys required by the SDP 212. Information that does not require additional security (e.g. other than X.509 certificates, sensitive parameters etc.) can be transferred using normal procedures (e.g., file transfer/messaging).

According to one or more embodiments, the system 200 illustrated in FIG. 2 improves performance of CPE 232 when DNS queries must be resolved. For example, when a user requires access to a particular website over the internet, the CPE 232 (or software operating therein) establishes a secure connection with the terminal 210 in order to encrypt all subsequent data exchanged therebetween. The CPE 232 then submits a DNS query to the terminal 210 using the established encryption parameters The DNS query received by the SDP 212, therefore, cannot be accessed by any unauthorized personnel. According to at least one embodiment, the SDP 212 can decrypt the DNS query in order to access some or all of the information contained therein. The SDP 212 subsequently compares the content certain parameters in the DNS query to various records that are stored within the storage unit 214. Upon detecting a matching record, the SDP 212 would return an encrypted copy of the record to the CPE 232 in response to the DNS query. As will be discussed in greater detail below, the matching record must satisfy various requirements in order to be considered valid. The internet protocol (IP) address contained within the record can now be used by the CPE 232 in order to establish a connection to the desired website or web page. Thus, rather than transmitting the request over the satellite link 240 to the gateway 250 and subsequently to the authoritative DNS server 270, the terminal 212 is capable of providing the record directly to the CPE 232.

Depending on the particular DNS query received from the CPE 232, there may be occasions when a matching record does not exist within the storage 214 of the SDP 212. There may also be occasions where the record has expired or become otherwise invalid. In such instances, the terminal 210 can be configured to forward the DNS request to the authoritative DNS server 270 via the gateway 250. For example, the terminal 210 can establish a communication link with the gateway 250 using the satellite network 240. The terminal 210 would subsequently forward the encrypted DNS query to the gateway 250. Next, the gateway 250 would submit the encrypted query to the authoritative DNS server 270 over the external network 260. The authoritative DNS server 270 would subsequently decrypt the DNS query and search for a matching record. An encrypted copy of the matching record is returned to the CPE 232 along the same path. The matching record from the authoritative DNS server 270 is herein referred to as an authoritative record.

According to at least one embodiment, prior to supplying the authoritative records to the CPE 232, the SDP 212 decrypts the encrypted authoritative record and stores a copy within its storage unit 214. The SDP 212 subsequently encrypts the authoritative record (i.e., using the parameters previously established with the CPE), and supplies the encrypted authoritative record to the CPE 232 in response to the DNS query. Once a copy of the authoritative record has been stored within the SDP 212, it can be supplied in response to DNS queries received from any of the CPEs 232 supported by the terminal 210. This can continue until the authoritative record is determined to be invalid or expired.

According to one or more embodiments, the SDP 212 can be configured to monitor the status of records contained within the storage unit 214. Upon detecting that a particular record has expired or will soon expire, the SDP 212 can independently initiate a back refresh to update the record. For example, the SDP 212 can independently submit a DNS query to the authoritative DNS server 270, and replace the expired record with the authoritative record newly received from the DNS server 270. Depending on the specific implementation, a threshold can be set to identify records that are close to expiring so that a back refresh can be initiated. The threshold can be assigned any desired value for providing appropriate operation of the system 200. Furthermore, the threshold can be dynamically adjusted based, at least in part, on domain name, time of day, geographic location, time zone, etc. The SDP 212 can examine the time to live (TTL) parameter within the records to identify records whose TTL parameters contain a value satisfying the criteria. If the threshold is set for thirty seconds, for example, then all records having TTL values of thirty seconds or less would be subject to a back refresh.

Various embodiments further allow for modification of the records, for example, such that the record's status appears valid (or unexpired), or the status changes from invalid (or expired) to valid (or unexpired). More particularly, the SDP 212 can modify one or more parameters within the record in order to reflect the changed status. When the SDP 212 conducts a search of the storage unit 214, the record would be considered valid, and supplied to the CPE 232. For example, the SDP 212 can determine a difference between the current time and the time at which the record was first cached to obtain an elapsed time for the record. The elapsed time is then checked against the TTL parameter to determine if the record is still valid. More particularly, a lower elapsed time would indicate the record is still valid. The remaining life of the record would correspond to the difference between the TTL and the elapsed time. A higher elapsed time would indicate that the record has expired. Furthermore, if the elapsed time is greater than the TTL, then the difference between the elapsed time and the TTL can correspond to an expiration time for the record as further discussed with respect to FIGS. 6 and 8.

According to an embodiment, if the record is determined to be expired, the SDP 212 can replace the TTL parameter with a value which indicates the record is still valid. Depending on the specific system implementation and particular record, however, the SDP 212 may replace the TTL parameter with a low value (e.g., 1-10) to facilitate use of the record only for a short time period. According to other embodiments, if the SDP 212 has analyzed patterns associated with the record and determined that changes occur infrequently, the expired record may be provided to the CPE without modifying the TTL parameter. It should be noted that different units of time may be used, depending on the specific implementation and the standards in place for the parameter at the time of implementation.

According to embodiments in which a gateway DNS server 252 is included within the gateway 250, the gateway DNS server 252 can be configured to supply records to the CPE 232 without sending the DNS queries to the authoritative DNS server 270. For example, the gateway DNS server 252 can examine the content of any encrypted DNS queries received from the CPE 232 in order to identify their contents. The gateway DNS server 252 can subsequently search an internal storage unit or cache (not shown) in order to determine the existence of a valid record corresponding to the received DNS query. Valid records can be returned to the CPE 232 instead of submitting the DNS query to the authoritative server 270. According to various embodiments, the gateway DNS server 252 can be further configured to monitor the status of records contained therein. Any records that have expired, or are close to expiring, can be identified so that a back refresh can be performed to obtain a current (i.e., valid) authoritative record from the authoritative DNS server 270. The gateway DNS server 252 can be further configured to store a copy of any authoritative records received from the authoritative DNS server 270 in response to a query from one of the CPE 232. Similar to the SDP 212, the gateway DNS server 252 can be configured to modify records stored therein so that they can be supplied in response to queries, if appropriate conditions are satisfied.

Figure 3:
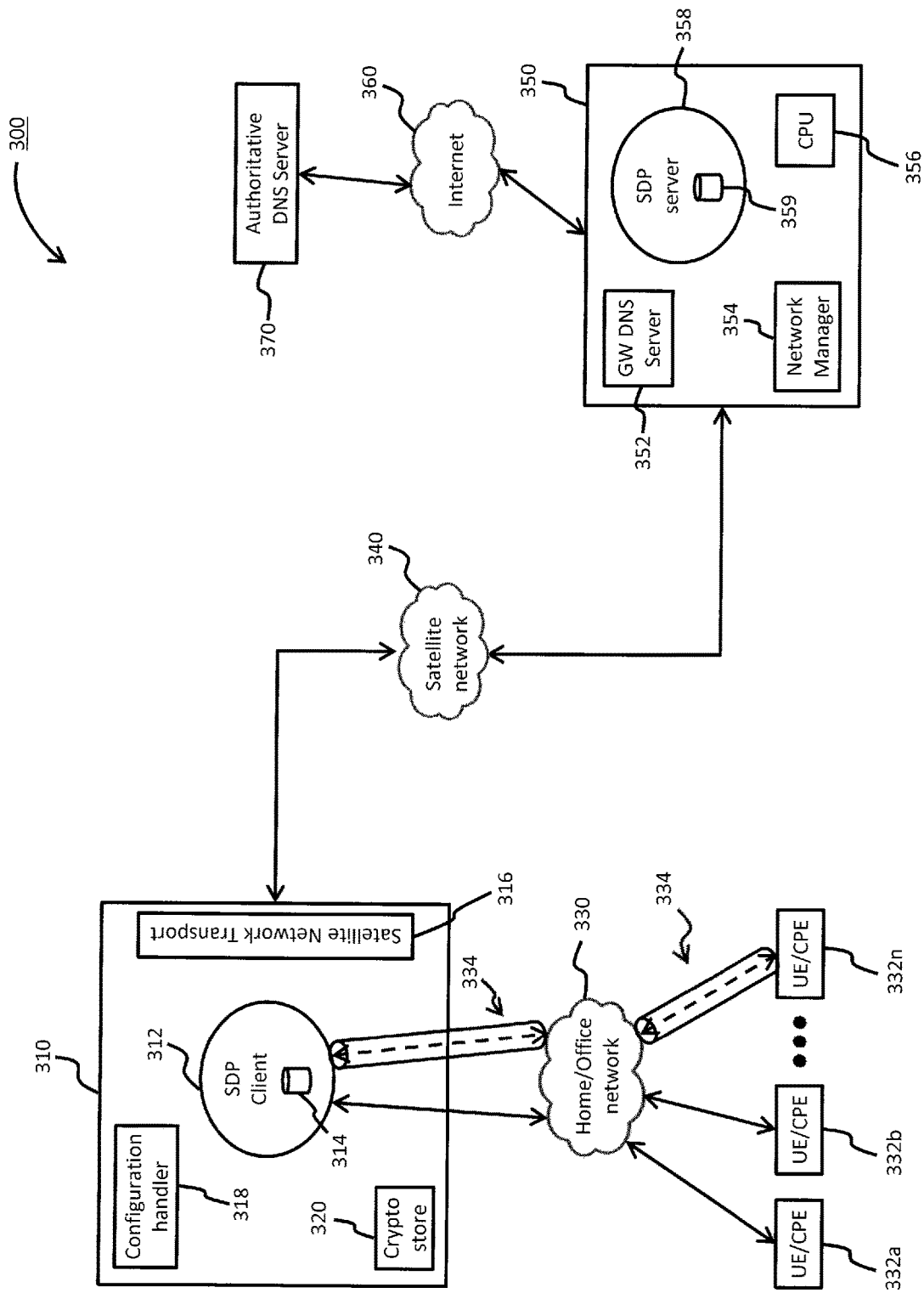
FIG. 3 is a diagram of a system for using a distributed secure DNS proxy to improve network performance, according to one or more embodiments.

FIG. 3 illustrates a system 300 for applying a distributed secure DNS proxy to improve performance when using secure DNS. The system 300 includes a terminal 310 configured to establish communication with a gateway 350 via a satellite network 340, and exchange various types of information such as, for example, voice, data, control signals, etc. According to the embodiment illustrated in FIG. 3, the terminal 310 includes a secure DNS proxy client 312 (SDP client), a satellite network transport unit 316, a configuration handler 318, and a crypto store 320. Such components allow the terminal 310 to monitor, process, and/or improve DNS search performance. The terminal 310 can further include one or more processing units (not shown) configured to control and/or assist in performing various operations. Furthermore, components such as the SDP client 312, satellite network transport 316, configuration handler 318, and crypto store 320 can also incorporate processing units and/or co-processors in order to perform various tasks pertaining to processing encrypted DNS queries.

According to the embodiment illustrated in FIG. 3, the SDP client 312 can also include a storage unit 314 capable of storing information associated with DNS queries. The storage unit 314 can be configured in various manners including, for example, solid-state storage devices, standard non-volatile memory, high performance cache storage, etc. The satellite network transport unit 316 can include hardware and/or software configured to provide transport path between the terminal 310 and the Gateway 350. According to various embodiments, the satellite network transport unit 316 can be configured to optimize information exchange over the satellite link, by implementing, for example, one or more performance enhancing proxies (PEP) designed to improve efficiency over the satellite link. The configuration handler 318 includes various components (not shown) configured to interact with the terminal 310 and gateway 350 to provide necessary configuration information. The configuration handler 318 can be configured, for example, to provide secure DNS proxy functionality by supplying configuration details for secure transport modes (e.g., HTTPS, TLS, DTLS, etc.), X.509 certificates and the associated private key, connection reuse parameters, timers, etc. The crypto store 320 can be configured as a storage unit which holds sensitive authentication and encryption related configuration information such as X.509 certificates, private keys, etc. Furthermore, the crypto store 320 can be configured to implement various mechanisms designed to ensure that encryption information is only accessible by authorized entities. Various embodiments also allow the crypto store 320 to monitor and track access to any information contained therein.

According to at least one embodiment, the terminal 310 can perform functions associated with connecting one or more CPEs 332 to the gateway 350 for subsequent access to private networks or a public network such as the internet 360. For example, the terminal 310 can interconnect a plurality of CPEs 332 via a home or office network 330 via a router or switch. The terminal 310 can incorporate various networking functionality (e.g., routing, switching, etch.), ports (e.g., ethernet, USB, etc.), and wireless transceivers for establishing wired and/or wireless connections to the CPEs 332. The terminal 310 is configured to transmit and receive traffic to/from the gateway 350 via the satellite network 340. The gateway 350 subsequently forwards user traffic (from the CPEs) to/from the external network 360. According to one or more embodiments, all traffic over the satellite network 300 is encrypted using predetermined security protocols in order to minimize and/or eliminate data access by unauthorized parties.

According to at least one embodiment, a tunneling protocol can be used to establish a tunnel 334 between CPE 332*n* and the terminal 310. Thus, DNS queries from CPE 332*n* can be injected into the tunnel 334 towards the terminal 310. DNS responses (or records) from the terminal 310 can be injected into the tunnel 334 towards CPE 232*n*. Depending on the specific implementation, CPE 332*n* may be configured to utilize a tunneling protocol which terminates at the terminal 310. The terminal 310 would subsequently re-tunnel the interaction to the gateway 350 after applying network specific optimization techniques. When such configurations are used, and if the CPE 332*n* is configured to use the SDP client 312 for DNS resolution, then all DNS queries from the tunnel 334 will be diverted to the SDP client 312. The SDP client 312 would supply all records to the CPE 332*n* over the same tunnel 334. The record can be from the SDP client's storage unit 314, the SDP server 358, the gateway DNS server 352, or the authoritative DNS server 370.

As illustrated in FIG. 3, the gateway 350 can include a gateway DNS server 352, a network manager 354, one or more CPU 356, and a secure DNS proxy (SDP) server 358. Although the gateway 350 includes a gateway DNS server 352, it should be noted that various implementations can exclude the gateway DNS server 352. According to one or more embodiments, the CPU 356 can be configured to provide some or all of the functionality of the components within the gateway 350. According to other embodiments, the CPU 356 can be configured to supplement operation of other components within the gateway 350 by allocating excess computational resources, when available. The gateway 350 can further include various hardware and software components (not shown) necessary to facilitate normal operations. For example, the gateway 350 can include a radio frequency transceiver for transmitting and receiving information over the satellite network 340. The gateway 350 can further include one or more interfaces for establishing connections to various internal components, as well as terrestrial network connections. The terrestrial connections can facilitate, for example, communication between the gateway 350 and an authoritative DNS server 370 via the external network 360. According to various embodiments, the network manager 354 can be configured to generate and distribute configuration information and/or profiles to various components (e.g., terminals, CPEs, etc.) in the system 300. For example, the network manager 354 can Implement special procedures to facilitate secure transfer of private keys required by the SDP client 312. Information that does not require additional security (e.g. other than X.509 certificates, sensitive parameters etc.) can be transferred using normal procedures (e.g., file transfer/messaging).

According to the embodiment illustrated in FIG. 3, the SDP server 358 includes a storage unit 359 capable of storing information associated with DNS queries. The storage unit 359 can be configured as a solid-state storage device, standard non-volatile memory, high performance cache storage, etc. Each SDP client 312 independently maintains its storage unit 314 with records that can be supplied to the CPE 332 in response to receive DNS queries. The SDP server 358 is configured to operate in a client/server type relationship with all terminals 310 (only one shown) supported by the gateway 350.

When a user requires access to a particular website, the CPE 332 (or software operating therein) establishes a secure connection with its associated terminal 310 in order to encrypt all subsequent data exchange. The CPE 332 then submits a DNS query to the terminal 310 using the established encryption parameters. According to at least one embodiment, the SDP client 312 can decrypt the DNS query in order to access some or all of the information contained therein. The SDP client 312 subsequently compares the content certain parameters in the DNS query to various records that are stored within the storage unit 314. Upon detecting a matching client record, the SDP client 312 would return an encrypted copy of the client record to the CPE 332 in response to the DNS query.

If a matching client record does not exist within the storage 314 of the SDP client 312 or the matching client record has expired (or become invalid), the SDP client 312 forwards the DNS query to the SDP server 358. According to at least one embodiment, the SDP client 312 can encrypt the DNS query using the parameters set with the CPE 332 prior to forwarding to the SDP server 358. According to other embodiments, the SDP client 312 can leave the DNS query unencrypted and allow the terminal 310 and gateway 350 to utilize encryption protocols applied to all traffic over the satellite network 340. Such embodiments can further improve efficiency over the satellite network 340 by eliminating overhead, for example, associated with TLS encryption.

Upon receiving the DNS query, the SDP server 358 accesses at least some of the information contained therein. Depending on the specific implementation, the gateway 350 may decrypt DNS queries that have been encrypted using the satellite encryption protocols. Alternatively, the SDP server 358 may be configured to decrypt the DNS query if the SDP client 312 applies encryption prior to transmitting over the satellite network 340. The SDP server 358 subsequently compares the content of parameters in the DNS query to various records that are stored within its storage unit 359. Upon detecting a matching server record, the SDP server 358 would return a copy of the server record to the SDP client 312. Depending on the manner in which the DNS query was received, the SDP server 358 may encrypt the server record, or the gateway 350 may apply the satellite encryption protocols. The SDP client 312 would subsequently return an encrypted copy of the server record to the CPE 332 in response to the DNS query. As previously discussed, the gateway 350 can support multiple terminals 310 and SDP clients 312 that independently submit DNS queries. The SDP sever 358, therefore, is configured to establish multiple sessions to process the DNS queries and return the appropriate records.

According to various embodiments, the gateway 350 can include the gateway DNS server 352 which can be utilized when the SDP server 358 does not contain a matching server record. More particularly, if the SDP server 358 does not contain a matching server record for the received DNS query, the gateway DNS server 352 can be searched. The gateway DNS server 352 can be configured to decrypt the DNS query, if necessary, to access information contained therein. The gateway DNS server 352 would compare the content of parameters in the DNS query to gateway records stored therein. If a matching gateway record is found, the gateway DNS server 352 would return a copy of the gateway record to the SDP client 312. According to at least one embodiment, if a matching gateway record is found, it is forwarded to the SDP server 358. The gateway record can optionally be stored in the SDP server 358, prior to being forwarded to the SDP client 312.

If the SDP server 358 and/or the gateway DNS server 352 do not contain matching records, the DNS query is encrypted and submitted to an authoritative DNS server 370 using a private network or a public network such as the internet 360. The authoritative DNS server 370 would subsequently decrypt the DNS query and search for a matching record. An encrypted copy of the matching authoritative record is then returned to the CPE 332 along the same path. More particularly, the encrypted authoritative record would be received by SDP server 358 and decrypted. The authoritative record would then be transmitted to the SDP client 312 using any encryption protocols applied to traffic over the satellite network 340. The SDP client 312 would remove the encryption from the satellite network 340, if necessary, and encrypt authoritative record using the encryption parameters established with the CPE 332.

According to an embodiment, the SDP server 358 may elect to submit the DNS query directly to the authoritative DNS server 370 instead of the gateway DNS server 352. This can be done, for example, if previous analysis of the DNS query resulted in authoritative records having very short TTL parameter values. The SDP server 358 can therefore conclude that any gateway records would have expired at approximately the same time as an expired server record. This can also be done if previous analysis of DNS queries indicates that a particular record is consistently found to be invalid after being modified. The SDP server 358 can conclude that an authoritative record should be retrieved if a record is expired or not found in its storage unit 359. Furthermore, various embodiments can allow the terminal 312 to provide an indication of its preference to submit the query directly to the external authoritative DNS server 370, or to bypass the gateway DNS server 352 if a valid record is not available from SDP server 358.

According to various embodiments, components such as the SDP client 312, the SDP server 358, and the gateway DNS server 352 can be configured modify one or more parameters within the record. The modification would cause the record's status to appear valid (or unexpired), or change the record's status from invalid (or expired) to valid (or unexpired). According to at least one embodiment, if the TTL parameter value for a particular record is less than an elapsed time for the same record (indicating that the record is expired), the TTL value can be modified so that the value is changed to a low value (e.g., 1, 2, etc.) to indicate that the record is valid. When a search is conducted in response to a DNS query, the expired record would be retrieved, modified to change the TTL value, and supplied to the CPE 332 as a valid record. The record may be supplied to the CPE 332 unmodified, if prior analysis by the SDP 312 client suggests, with a good level of confidence (e.g., greater than 50%), the record will remain valid past the expiration time. According to an embodiment, a back refresh is performed for any record that is modified and supplied to the CPE 332. An updated authoritative record would then replace the modified record. If the modified record has in fact expired, the CPE 332 would resubmit the query, and receive the updated authoritative record.

According to various embodiments, updated authoritative records can be shared between the SDP client 312, the SDP server 358, and the gateway DNS server 352. If a matching record (valid or expired) does not exist in the SDP client 312 and SDP server 358, the gateway DNS server 352 would return the modified record in response to the DNS query. The gateway DNS server 352 would also perform a back refresh, and share a copy of the received authoritative record with the SDP client 312 and the SDP server 358. According to an embodiment, the SDP client 312, the SDP server 358, and the gateway DNS server 352 can periodically or persistently exchange records between each other.

If it is determined that the modified record has expired, the CPE 332 would resubmit the DNS query to the SDP client 312. Rather than transmitting the DNS request over the satellite link 340, the SDP client 312 would immediately return a copy of its record that was updated with the authoritative record. Such features can advantageously eliminate the delay associated with forwarding the query (over the satellite link 340) to the gateway 350, and subsequently to the authoritative DNS server 370. Furthermore, bandwidth over the satellite network 340 can be reduced when the total number of CPEs 332 in the system 300 are factored.

Figure 4:
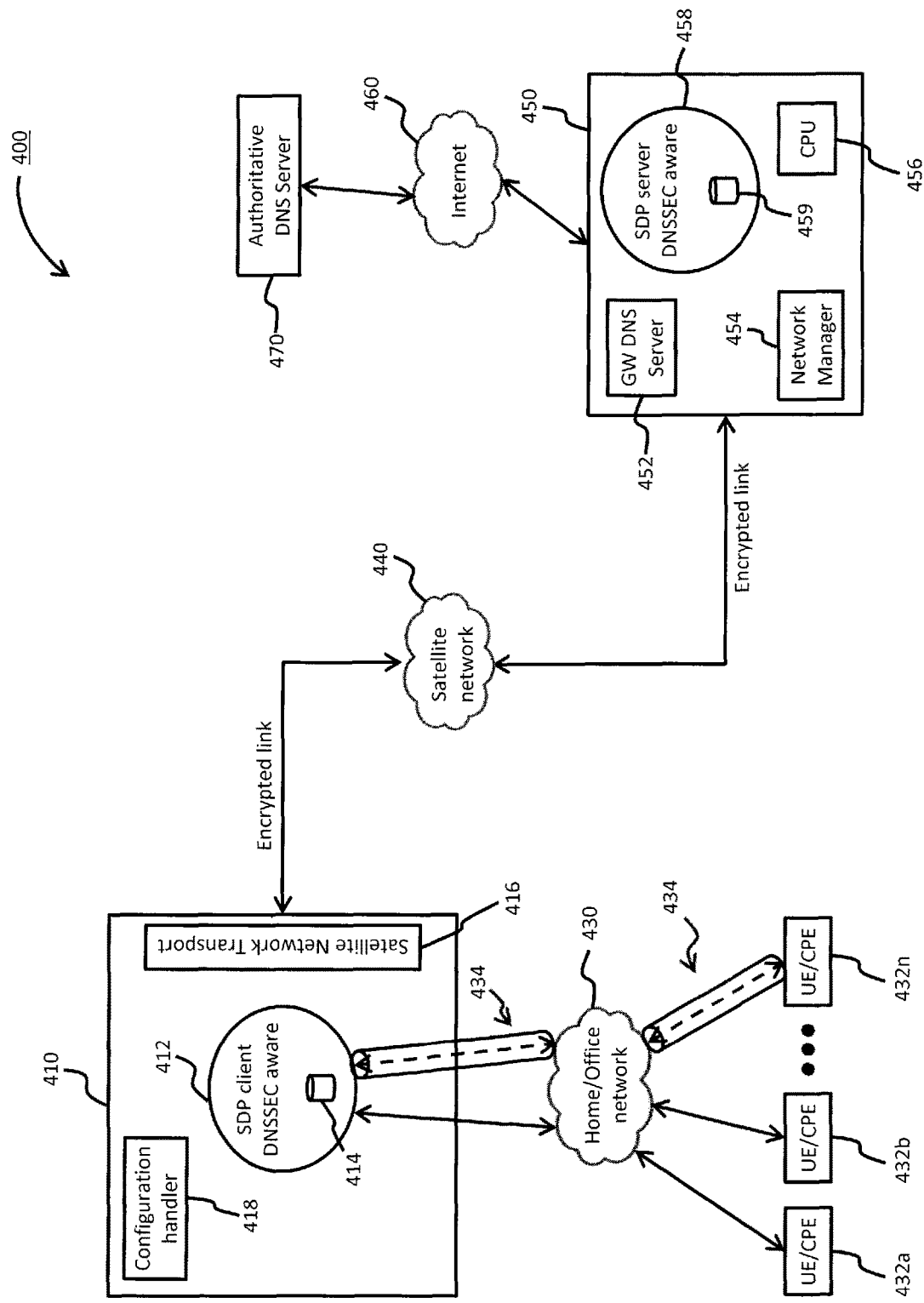
FIG. 4 is a diagram of a system for improving network performance using a DNSSEC-aware proxy, according to one embodiment.

FIG. 4 illustrates a system 400 for improving performance using a DNSSEC-aware proxy. The system 400 includes a terminal 410 configured to establish communication with a gateway 450 via a satellite network 440, and exchange various types of information such as, for example, voice, data, control signals, etc. The terminal 410 includes, in part, a satellite network transport unit 416 and a configuration handler 418, which allow the terminal 410 to monitor, process, and/or improve DNS search performance. Similar to previously described embodiments, the terminal 410 can include one or more processing units (not shown) configured to control and/or assist in performing various operations.

According to the embodiment illustrated in FIG. 4, the terminal 410 includes an SDP client 412 configured to implement domain name system security (DNSSEC) protocols to secure and authenticate information associated with DNS requests and responses (i.e., records). In general, DNSSEC applies security techniques such as public/private key encryption to facilitate authentication of both the data and source (i.e., sender) of information being exchanged. The data being exchanged using DNSSEC remains accessible in text format. However, any tampering or modification of the data would result in a data authentication failure and/or a sender authentication failure. DNS queries and records, therefore, can be accepted as authentic if the data and sender can be verified based, in part, on the digital signature. The SDP client 412 can also include a storage unit 414 capable of storing information associated with DNS queries. According to the embodiment illustrated in FIG. 4, the configuration handler 418 can be further configured to supply configuration parameters for the terminal 410.

The terminal 410 is configured to facilitate communication between the CPEs 432 and external networks such as the internet 460. According to various embodiments, this can be accomplished by utilizing an external router/switch and/or onboard interfaces to establish connections with the CPEs 432 via a home or office network 430. The terminal 410 transmits CPE traffic to/from the gateway 450 via the satellite network 440. The gateway 450 subsequently forwards the CPE traffic to/from the external network 460. As previously discussed, all traffic over the satellite network 440 is encrypted using predetermined security protocols in order to minimize and/or eliminate data access by unauthorized parties.

According to at least one embodiment, a tunneling protocol can be used to establish a tunnel 434 between CPE 432n and the terminal 410. Thus, DNS queries from CPE 432n can be injected into the tunnel 434 towards the terminal 410. DNS responses (or records) from the terminal 410 can be injected into the tunnel 434 towards CPE 232n. Depending on the specific implementation, CPE 432n may be configured to utilize a tunneling protocol which terminates at the terminal 410. The terminal 410 would subsequently re-tunnel the interaction to the gateway 450 after applying network specific optimization techniques. When such configurations are used, the SDP client 412 can be configured to scan for DNS queries and respond to such queries based on contents of the storage device 414, prior to re-tunneling the traffic from the CPE 432n to the gateway 450. The cached record (which may include expired records) would also be injected back into the tunnel towards the CPE 432n over the same tunnel 434. The record can be from the SDP client's storage unit 414, the SDP server 458, the gateway DNS server 452, or the authoritative DNS server 470.

The gateway 450 can include a gateway DNS server 452, a network manager 454, one or more CPU 456, and a secure DNS proxy (SDP) server 458. Depending on the specific implementation, the gateway 450 can be configured without the gateway DNS server 452. According to one or more embodiments, the CPU 456 can be configured to provide some or all of the functionality of the components within the gateway 450. According to other embodiments, the CPU 456 can be configured to supplement operation of other components within the gateway 450 by allocating excess computational resources. Although not illustrated in FIG. 4, the gateway 450 can include various hardware and software components (e.g., RF transceiver, input/output ports, etc.) necessary to establish and maintain communication with the satellite network and external networks such as the internet 460 or private networks. The external network 460 can be used, for example to establish a communication link with the authoritative DNS server 470.

According to the embodiment listed in FIG. 4, the gateway DNS server 452 and the SDP server 458 are also configured to implement DNSSEC protocols to secure and authenticate information associated with DNS responses. The SDP server 458 includes a storage unit 459 capable of storing information associated with DNS queries. The gateway DNS server 452 also includes a storage unit (not shown) or other hardware configuration which enables storage, retrieval, and processing of information such as DNS queries and/or gateway records. According to various embodiments, the network manager 454 can be configured to generate and distribute configuration information to implement DNSSEC protocols as well as configuration information for other system components (e.g., terminals, CPEs, etc.) in the system 400.

Users requiring access to particular websites or IP addresses via the CPE 432 (or software operating therein) establish a connection with the terminal 410 and submit a DNS query that is compatible with DNSSEC specifications (or protocols). More particularly, the DNS query contains all the necessary parameters which allow and/or support a digital signature in accordance with DNSSEC specifications to be applied to a corresponding authoritative record. As previously discussed, the content of DNS queries with DNSSEC can be viewed because they are in text format. Since the SDP client 412 is DNSSEC aware, it examines the content of the DNS request, and searches the records stored in the storage unit 414. Upon detecting a matching client record, the SDP client 412 would return a copy of the client record to the CPE 432 in response to the DNS query. As can be appreciated, all client records stored in the storage unit 414 are digitally signed. The CPE 432 can then examine the client record in order to authenticate the data and sender. Since DNSSEC does not allow contents of the record to be modified, the client record supplied to the CPE 432 corresponds to a digitally signed authoritative record that was previously received and saved within the storage unit 414. The CPE 432 would therefore examine the client record and conclude it is a valid authoritative record from the authoritative DNS server 470.

If a matching client record does not exist within the storage 414 of the SDP client 412 or the matching client record has expired (or become invalid), the SDP client 412 forwards the DNS query to the SDP server 458. According to various embodiments, the DNS query can be encrypted using the layer-2/layer-3 encryption protocols applied to all traffic over the satellite network 440. Upon receiving the DNS query, the SDP server 458 accesses at least some of the information contained therein. Depending on the specific implementation, the gateway 450 may decrypt DNS queries that have been encrypted using the satellite encryption protocols. The SDP server 458 subsequently compares the content of parameters in the DNS query to various digitally signed server records that are stored within its storage unit 459. Upon detecting a matching server record, the SDP server 458 would return a copy of the server record to the SDP client 412. The SDP client 412 would subsequently return a copy of the server record to the CPE 432 in response to the DNS query. As previously discussed, the gateway 450 can support multiple terminals 410 and SDP clients 412 that independently submit DNS queries. The SDP sever 458, therefore, is configured to establish multiple sessions to process the DNS queries and return the appropriate server records.

According to various embodiments, the gateway 450 can include the gateway DNS server 452 which can be utilized when the SDP server 458 does not contain a matching server record. More particularly, if the SDP server 458 does not contain a matching server record for the received DNS query, the gateway DNS server 452 can be searched. The gateway DNS server 452 would compare the content of parameters in the DNS query to gateway records stored therein. Similar to the client records and server records, the gateway records are also digitally signed in accordance with DNSSEC protocols. If a matching gateway record is found, the gateway DNS server 452 would return a copy of the gateway record to the SDP client 412. According to at least one embodiment, if a matching gateway record is found, it is forwarded to the SDP server 458. The gateway record can optionally be stored in the SDP server 458, prior to being forwarded to the SDP client 412.

If the SDP server 458 and/or the gateway DNS server 452 do not contain matching records, the DNS query is submitted to an authoritative DNS server 470 using a private network or a public network such as the internet 460. The authoritative DNS server 470 would subsequently search for a matching record. A copy of the matching authoritative record is then digitally signed and returned to the CPE 432 along the same path. According to an embodiment, the SDP server 458 may elect to submit the DNS query directly to the authoritative DNS server 470 instead of the gateway DNS server 452. This can be done, for example, if previous analysis of the DNS query resulted in authoritative records having very short TTL parameter values. The SDP server 458 can therefore conclude that any gateway records would have expired at approximately the same time as an expired server record.

Unlike the embodiments illustrated in FIGS. 2 and 3, records cannot be modified due to implementation of DNSSEC. Accordingly, the SDP client 412, the SDP server 458, and the gateway DNS server 452 cannot modify expired records so that they can be supplied to the CPE 432 in response to DNS queries. Various embodiments, therefore, configure the SDP client 412, the SDP server 458, and the gateway DNS server 452 to monitor the status of stored records, either continuously or at predetermined intervals) in order to perform a back refresh on any records that are expired, or nearly expired. Such features can reduce delays associated with resolving the DNS query by pre-fetching authoritative records to replace expired or nearly expired records stored in the SDP client 412, the SDP server 458, and/or the gateway DNS server 452.

According to various embodiments, the SDP client 412, the SDP server 458, and/or the gateway DNS server 452 can be configured to supply expired records to the CPE, despite the use of DNSSEC protocols to digitally sign the records. More particularly, the SDP client 412, the SDP server 458, and the gateway DNS server 452 can independently monitor DNS queries and authoritative records in order to identify any patterns associated therewith. Depending on the specific implementation, such analysis can be performed over a predetermined time period, continuously, etc. For example, authoritative records supplied in response to DNS queries can be monitored and analyzed for a period of 1 hr., 2 hrs., 5 hrs., 10 hrs., 24 hrs., etc. Depending on the specific implementation, the analysis can be performed using machine learning techniques, statistical inference algorithms, etc. Furthermore, the SDP client 412, the SDP server 458, and the gateway DNS server 452 can exchange results of their individual analysis with each other According to at least one implementation, examination of a particular record may indicate that the record has expired. However, a newly retrieved record for the same DNS query may contain identical information (e.g., IP addresses) with a different expiration value (e.g., TTL). Such a pattern may repeat for extended periods (e.g., 1 hr., 3 hrs., 5 hrs., 12 hrs., 24 hrs., etc.). In contrast, examination of another record may reveal that indicating that the IP address only repeats over a 5 min. interval. Such analysis can be the basis for supplying an expired record despite the use of DNSSEC protocols. More particularly, if it is determined that the IP address associated with the record is unlikely to change prior to its use by the CPE, or prior to a predetermined interval, then the record can be supplied in response to the DNS query. As can be appreciated, however, the expired record could only be supplied if the associated DNSSEC keys are active (i.e., unexpired) and unchanged. Accordingly, such expired records can be supplied despite the inability to modify the TTL parameter due to the use of DNSSEC protocols. Furthermore, such analyses can be used to supply encrypted DNS records, as previously discussed with respect to FIGS. 2 and 3, without modifying the TTL parameter.

Figure 5:
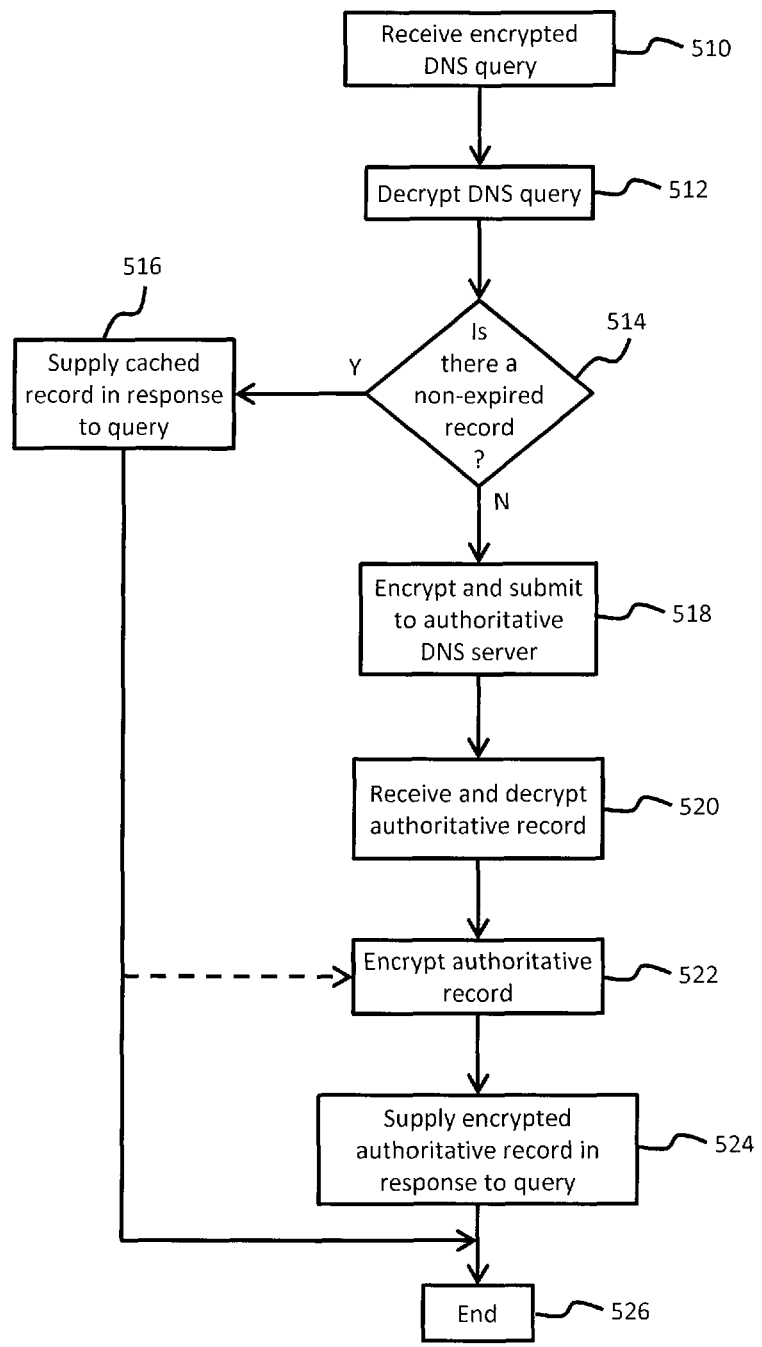
FIG. 5 is a flowchart of a process for improving secure DNS performance, according to one embodiment.

FIG. 5 is a flowchart of a process for improving secure DNS performance, in accordance with at least one embodiment. At 510, an encrypted DNS query is received at the SDP. Depending on the specific implementation, the DNS query can be received from a variety of CPE including, but not limited to computers, laptops, printers, mobile phones, tablets, internet of things (IOT) devices, smart devices, etc. At 512, the encrypted DNS query is decrypted in order to access its contents. At 514, it is determined whether a non-expired record exists for the received DNS query. According to an embodiment, the SDP can search its storage unit in order to determine whether or not a non-expired record exists for the received DNS query. If the SDP locates a non-expired record, control passes to 516 where the record is supplied to the CPE in response to the DNS query. For example, if the DNS query originates from a tablet or laptop, the non-expired record would be supplied to the tablet or laptop in response. Depending on the particular implementation, the record can be encrypted prior to being supplied. Control would then pass the 526.

According to at least one embodiment, if a non-expired record is not located at 514, control passes to 518. The received DNS query is encrypted with new parameters and submitted to an authoritative DNS server. The SDP can, for example, establish a communication channel with the gateway via the satellite network to transmit information corresponding to the received DNS query. The gateway would subsequently establish an encrypted link in order to submit the DNS query to the authoritative DNS server. As previously discussed, the authoritative DNS server is an external entity that functions as a trusted source for information such as authoritative records. At 520, an authoritative record is received from the authoritative DNS server and decrypted. The authoritative record corresponds to a record satisfying the DNS query originally submitted by the CPE. According to an embodiment, the authoritative record can be transmitted to the SDP via the satellite network. At 522, the authoritative record is encrypted in accordance with the encryption parameters originally established with the CPE. At 524, the encrypted authoritative record is supplied (e.g., to the CPE) in response to the DNS query. Thus, the SDP attempts to resolve any received DNS queries without the need to transmit information over the satellite link. If the DNS query cannot be resolved, however, an authoritative record is obtained from an external source such as the authoritative DNS server. The process ends at 526.

Figure 6:
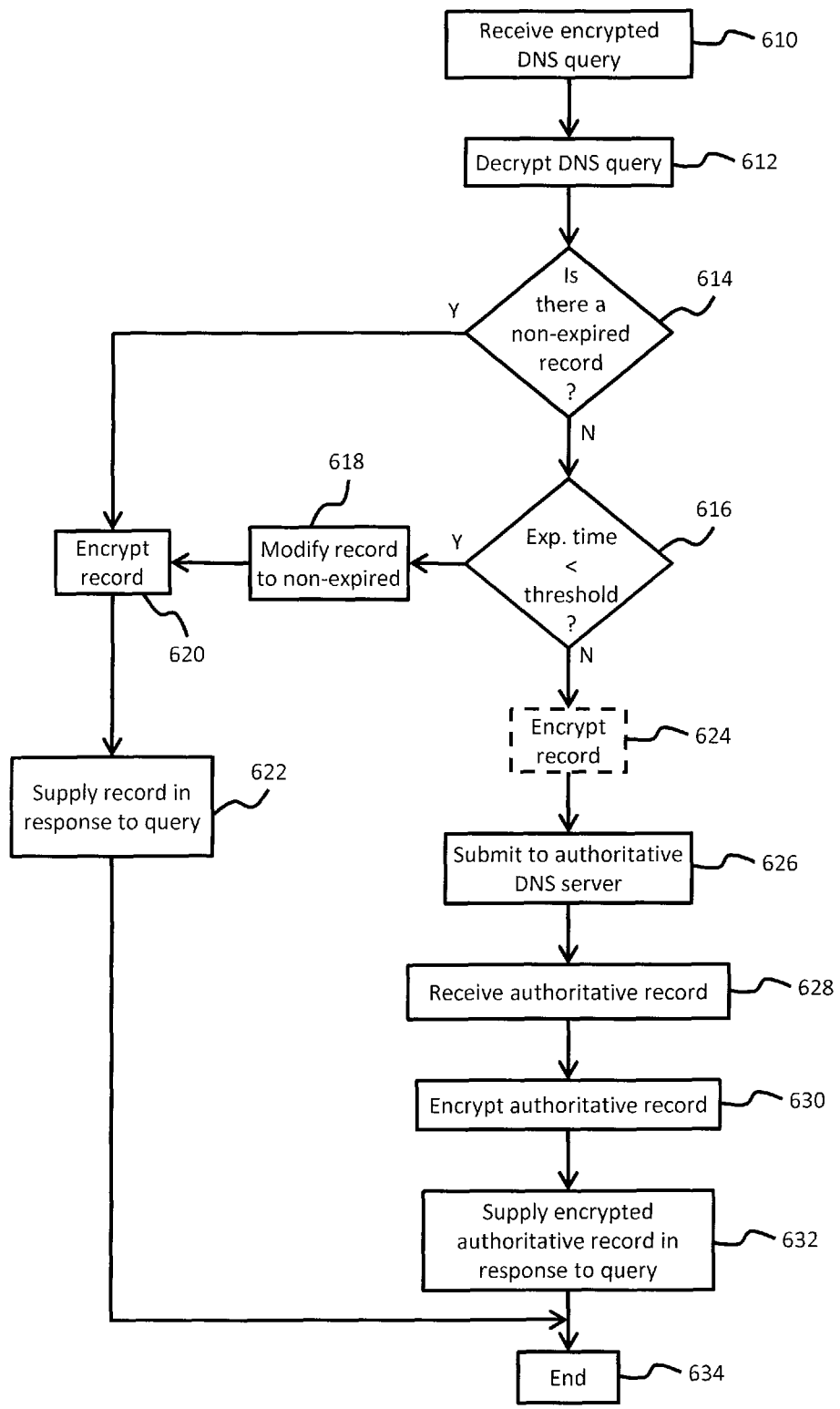
FIG. 6 is a flowchart of a process for improving secure DNS performance, according to one or more embodiments.

FIG. 6 is a flowchart of a process for improving secure DNS performance, in accordance with one or more embodiments. At 610, and encrypted DNS query is received, for example, at the SDP. As previously discussed, various implementations provide for the SDP to the located either within the terminal, within the gateway, or both. The encrypted DNS query would, therefore, be supplied to the appropriate location. At 612, the received DNS query is decrypted in order to access information contained therein. At 614, a search is conducted to determine whether or not a non-expired record exists within the SDP to satisfy the received DNS query. Since the DNS query has been decrypted, its contents can be examined so that the search can be performed to obtain the matching record. If a non-expired record is found, control passes to 620. The record is encrypted at 620. At 622, the encrypted record is supplied in response to the DNS query.

According to at least one embodiment, if a non-expired record does not exist within the SDP, control passes to 616. It is determined, at 616, whether the expiration time of the record is less than a predetermined threshold. This can correspond, for example, to the situation where a record currently exists in the storage of the SDP, but the record has expired. According to various embodiments, the expiration of the record can be based, at least in part, on the value of its TTL parameter and/or its elapsed time. Furthermore, the threshold can be set differently depending on the particular record. According to an embodiment, the threshold can be set based, at least in part, on analysis performed by the SDP. As previously discussed, the SDP can be configured to perform various analysis on DNS queries and/or records that are received. The analysis can result in the detection of patterns for different DNS queries and records. For example, examination of a particular record may indicate that the record has expired. However, a newly retrieved record for the same DNS query may contain identical information (e.g., IP addresses) with a different expiration value (e.g., TTL). Such a pattern may repeat for extended periods (e.g., 1 hr., 3 hrs., 5 hrs., 12 hrs., 24 hrs., etc.). In contrast, examination of another record may reveal that indicating that the IP address only repeats over a 5 min. interval. Accordingly, different threshold values can be selected for each of these 2 records. Furthermore, certain records may not be assigned (or associated with) an expiration threshold, for example, if the SDP's analysis suggests that the record consistently changes in accordance with the TTL value.

If the expiration time of the record is less than the threshold value, control passes to 618. The record is then modified such that its status is reflected as being non-expired. According to at least one embodiment, the SDP can modify one or more parameters within the record in order to reflect the changed status. For example, if the TTL value is less than the elapsed time for a particular record (meaning the record has expired), the SDP can replace the TTL value with a low number (e.g., 1, 2, 3, etc.). Depending on the specific system implementation and particular record, however, the SDP may leave the TTL value unchanged based, at least in part, on prior analysis. After modification, the record is encrypted at 620. At 622, the encrypted record is supplied in response to the received DNS query.

If the expiration time of the record exceeds the threshold value, however, control passes to 624. According to at least one embodiment, the DNS query can be encrypted at 624. According to other embodiments, control can optionally pass to 626 where the DNS query is submitted to an authoritative DNS server. Thus, if the DNS query is encrypted, it can be supplied in encrypted form to the authoritative DNS server directly from the SDP. At 628, an authoritative record corresponding to the DNS query is received (or returned) from the authoritative DNS server. If the DNS query was encrypted at 624, it is returned in encrypted form at 628, and must be decrypted prior to transmission over the satellite network. At 630, the authoritative record is encrypted in accordance with the encryption parameters previously established with the CPE. At 632, the encrypted authoritative record is supplied in response to the original DNS query. The process ends at 634.

Figure 7:
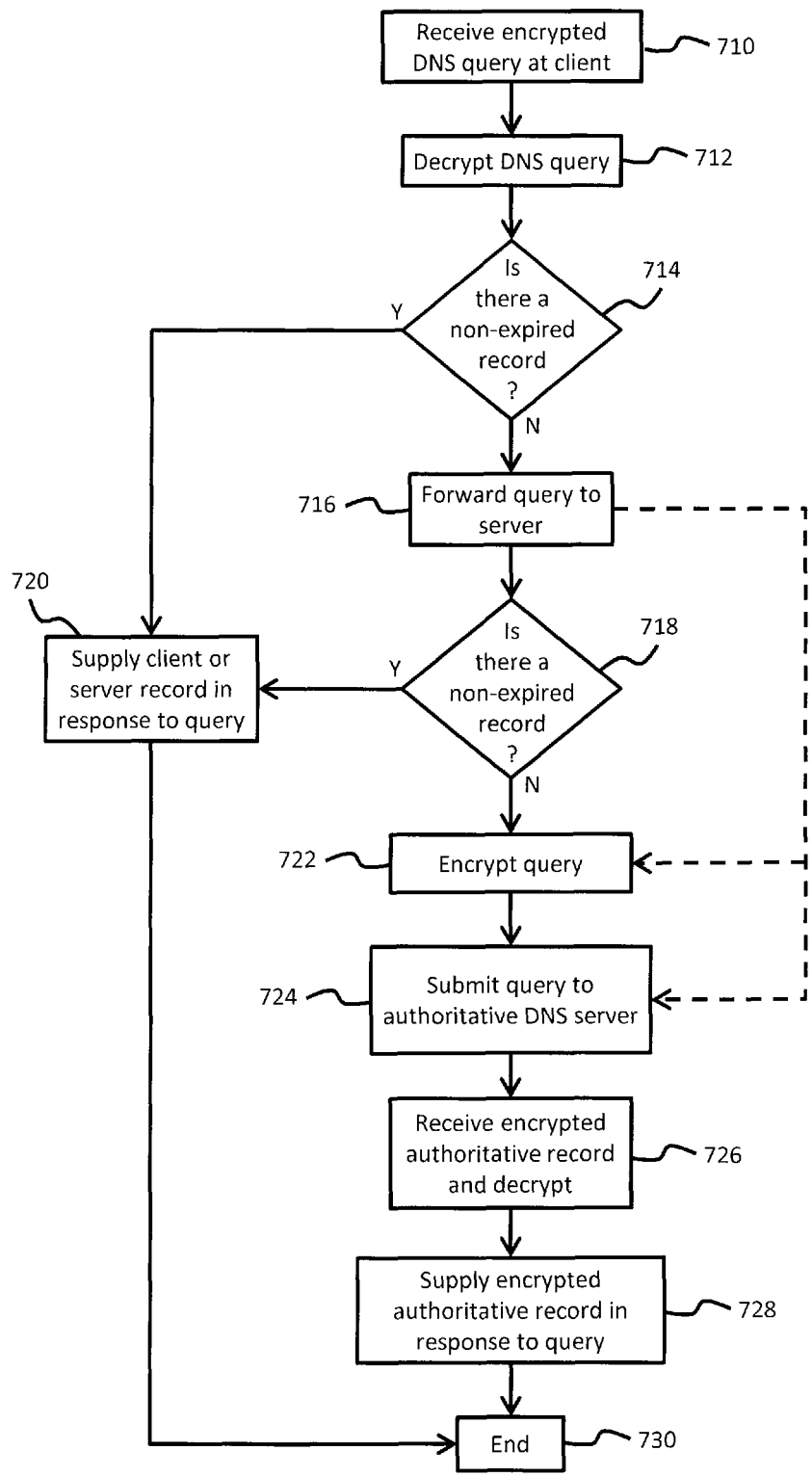
FIG. 7 is a flowchart of a process for using distributed secure DNS access, according to one embodiment.

FIG. 7 is a flowchart of a process for using distributed secure DNS access, in accordance with various embodiments. At 710, an encrypted DNS query is received at an SDP client. At 712, the DNS query is decrypted in order to access its contents. At 714, it is determined whether a non-expired record exists to satisfy the received DNS query. According to at least one embodiment, this corresponds to the SDP client conducting a search within its storage unit (or cache, etc.) to first locate a client record satisfying the DNS query, and then determine whether the client record has expired. If the SDP client locates a non-expired client record, control passes to 720. The non-expired client record is supplied in response to the received DNS query. If a non-expired client record is not located, control passes to 716 where the DNS query is forwarded to the SDP server.

At 718, it is determined whether a non-expired server record exists within a storage of the SDP server. If a non-expired server record is located, then it is supplied in response to the original DNS query. If a non-expired server record is not located within the storage of the SDP server, control passes to 722 where the DNS query is encrypted. At 724, the encrypted DNS query is submitted to the authoritative DNS server. According to at least one embodiment, the SDP client can request submission of the DNS query directly to the authoritative DNS server without determining whether a non-expired server record exists within the SDP server. Accordingly, control would pass from 716 directly to 722 or 724. At 726, an encrypted authoritative record is received by the SDP server in response to the DNS query. The SDP server decrypts and forwards the authoritative record to the SDP client over the satellite network. At 728, the authoritative record is encrypted and supplied in response to the original DNS query. As can be appreciated, the authoritative records received at 726 and 728 are encrypted using different encryption parameters. The process ends at 730.

Figure 8:
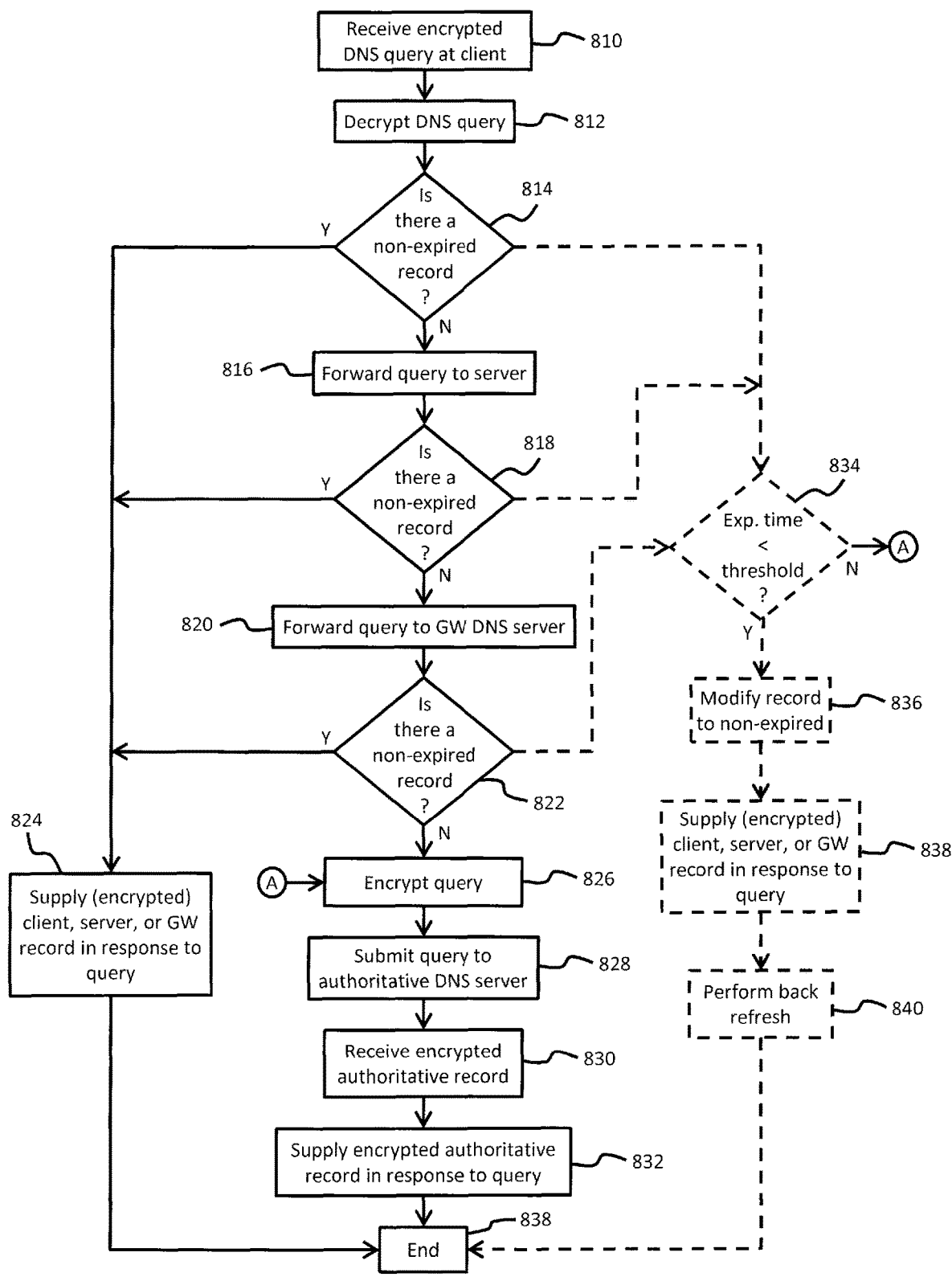
FIG. 8 is a flowchart of a process for using distributed secure DNS access, according to various embodiments.

FIG. 8 is a flowchart of a process for using distributed secure DNS access, according to various embodiments. At 810, an encrypted DNS query is received at the SDP client. At 812, the SDP client decrypts the DNS query in order to access various information contained therein. The SDP client uses at least some of the information contained in the DNS query in order to determine whether or not a non-expired client record exists for the DNS query at 814. As previously discussed, this can be accomplished by performing a search of client records that are stored within a storage unit of the SDP client. Depending on the specific implementation, the storage unit can also be in the form of a solid-state drive, non-volatile memory, high-speed cache memory, etc. If a non-expired client record is found within the storage unit of the SDP client, control passes to 824. Alternatively, if a non-expired record is not available, then the DNS query is forwarded to the SDP server at 816. According to at least one embodiment, the SDP client can encrypt the DNS query prior to forwarding to the SDP server. According to such embodiments, a second encryption layer is added when the DNS query is transmitted over the satellite link. According to other embodiments, however, the SDP client can transmit the DNS query in unencrypted form so that the encryption layer incorporated within the satellite link alone is applied. According to such embodiments, overhead associated with separate encryption of the DNS query prior to transmission can be eliminated.

At 818 the SDP server performs a similar search to determine whether or not a non-expired server record can be located for the received DNS query. If a non-expired server record is found within the storage of the SDP server, then control passes to 824. If a non-expired server record is not available, then control passes to 820, where the DNS query is forwarded to the gateway DNS server. A similar search is conducted, at 822, in order to determine whether a non-expired gateway record exists within the storage of the gateway DNS server. If a non-expired gateway record is available, control passes to 824. The retrieved record can then be encrypted and/or supplied in response to the received DNS query. More particularly, if a client record is retrieved from the SDP client, then a client record is supplied in response to the DNS query. Similarly, if a server record or gateway record is retrieved, then the server record or gateway record is supplied in response to the DNS query. Furthermore, if the DNS query is encrypted prior to being received at the SDP server and the gateway DNS server, the server record and gateway record would be encrypted prior to being transmitted to the SDP client. Regardless of whether or not the SDP server and the gateway DNS server receive the DNS query in encrypted form, the SDP client will encrypt any record being supplied in response to the DNS query.

If it is determined, at 822, that a non-expired record is not available within the storage of the gateway DNS server, then control passes to 826, where the DNS query is encrypted. At 828, the DNS query is submitted to an authoritative DNS server in its encrypted form. At 830, an encrypted authoritative record is received from the authoritative DNS sever. For example, the encrypted authoritative record can be received at the gateway DNS server. According to various embodiments, it is possible to omit use of the gateway DNS server for resolving any retrieved DNS queries. According to such embodiments, the SDP server can be configured to encrypt and forward the DNS query directly to the authoritative DNS server. Any authoritative records received in response to the DNS query would be supplied to the SDP server. The encrypted authoritative record is decrypted (e.g., by either the SDP server or the gateway DNS server) and forwarded to the SDP client over the satellite network. According to one or more embodiments, the SDP server and gateway DNS server store a copy of any authoritative records received from the authoritative DNS server. At 832, the authoritative record is encrypted (e.g., by the SDP client) and supplied in response to the received DNS query. The process would then end at 842. Similarly, if a non-expired record is found at either the SDP client, the SDP server, or the gateway DNS server, the process would end once the record is supplied in response to the DNS query.

According to at least one embodiment, it may not be necessary to immediately submit the DNS query to the authoritative DNS server if a non-expired record cannot be found at either the SDP client, the SDP server, or the gateway DNS server. As illustrated in FIG. 8, if a non-expired record cannot be found at steps 814, 818, and/or 822, control can optionally pass to 834. A test is performed at 834 to determine whether or not the expiration time of an expired record is less than a predetermined threshold. As previously discussed, the predetermined threshold can be set for specific records individually, in groups, unilaterally, etc. According to an implementation, the content of authoritative records can be monitored by the SDP client, the SDP server, and/or the gateway DNS server. The contents of all received authoritative records can be analyzed in order to detect various patterns between the authoritative records, the received DNS queries, time of day, geographic location, etc. Such analysis can be used, at least in part, to select an appropriate threshold value for each record or groups of records.

If the expiration time of the record is not less than the threshold value, then control passes to 826, where appropriate steps can be taken to submit the DNS query to the authoritative DNS server. If the expiration time of the record is less than the threshold value, however, then control passes to 836. The record is modified, at 836, in order to change its status such that it may be supplied as a non-expired record in response to the DNS query. According to various embodiments, at least one parameter in the expired DNS query can be modified in order to reflect the change in status to non-expired. At 838, the record is supplied in response to the DNS query. Depending on the location where the record was retrieved, a client record, a server record, or a gateway record would be supplied. Furthermore, the record can be encrypted by the SDP server or the gateway DNS server prior to being transmitted to the SDP client. The SDP client would decrypt such records once received from the satellite. Irrespective of the condition of the record when it arrives at the SDP client, the record is encrypted prior to being supplied in response to the DNS query. At 840, a back refresh is performed in order to update the modified record with a new authoritative record. The process would subsequently end at 842.

Figure 9:
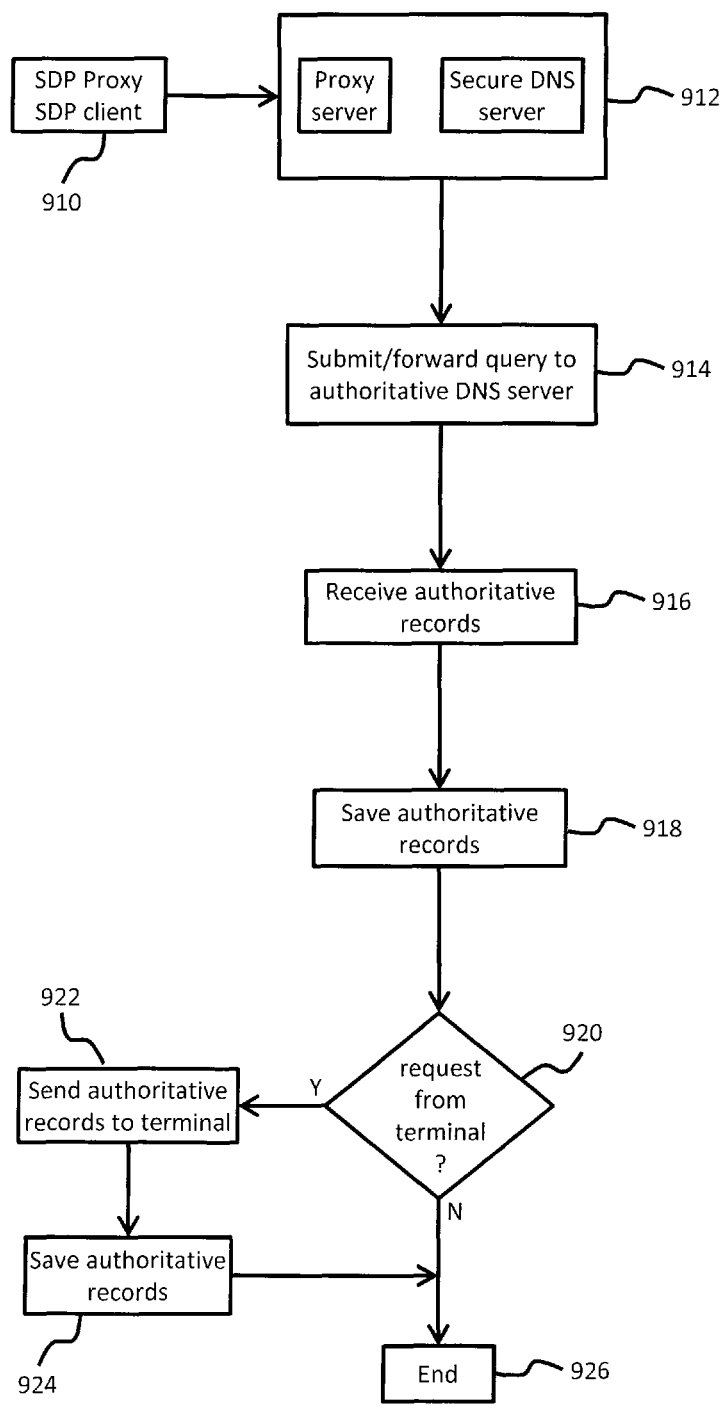
FIG. 9 is a flowchart of a process for performing a back refresh in conjunction with secure DNS access, according to one or more embodiments.

FIG. 9 illustrates a process for performing a back refresh, in accordance with one or more embodiments. At 910, a request is transmitted from either an SDP or an SDP client to initiate a back refresh to update a particular record (or client record). Depending on the specific implementation, the request can include a single DNS query or multiple DNS queries. The request is transmitted to the gateway at 912. According to one or more embodiments, the requests for a back refresh can also be initiated by the SDP server or gateway DNS server instead of, or in addition to, the request for back refresh that is transmitted from the client and/or SDP client. At 914, the DNS query is submitted (or forwarded) to the authoritative DNS server. For example, if the back refresh is associated with the SDP or the SDP client, then the gateway would simply forward the received DNS query (or queries) to the authoritative DNS server. If the DNS query originates from the gateway (i.e., the SDP server or gateway DNS server), then the DNS query is submitted directly to the authoritative DNS server. As previously discussed, the DNS queries submitted to the authoritative DNS server can be encrypted prior to being transmitted from the gateway. Furthermore, DNS queries transmitted from the SDP or SDP client can be forwarded to the authoritative DNS server in their encrypted form.

At 916, the authoritative DNS server returns authoritative records which correspond to the received DNS queries (i.e., back refresh). At 918, the authoritative records are saved at the gateway. More particularly, the authoritative records can be saved in the storage of the SDP server, the gateway DNS server, or both. According to at least one embodiment, any authoritative records received at the gateway can be saved regardless of whether or not they are received in response to DNS queries from the SDP or the SDP client. According to such embodiments, the SDP server can analyze authoritative records being supplied to all of the terminals which it supports, and take various steps to further improve system efficiency.

It is determined, at 920, whether or not the request originated from the terminal (i.e., SDP or SDP client). If the request originated from the terminal, then control passes to 922 where the authoritative records are sent back to the terminal in response to the request for back refresh. At 924, the authoritative records are saved in the storage of the SDP or SDP client. The process ends at 926. If it is determined, at 920, that the request did not originate from the terminal, then there is no need to further transmit the authoritative records. The process would end at 926.

Figure 10:
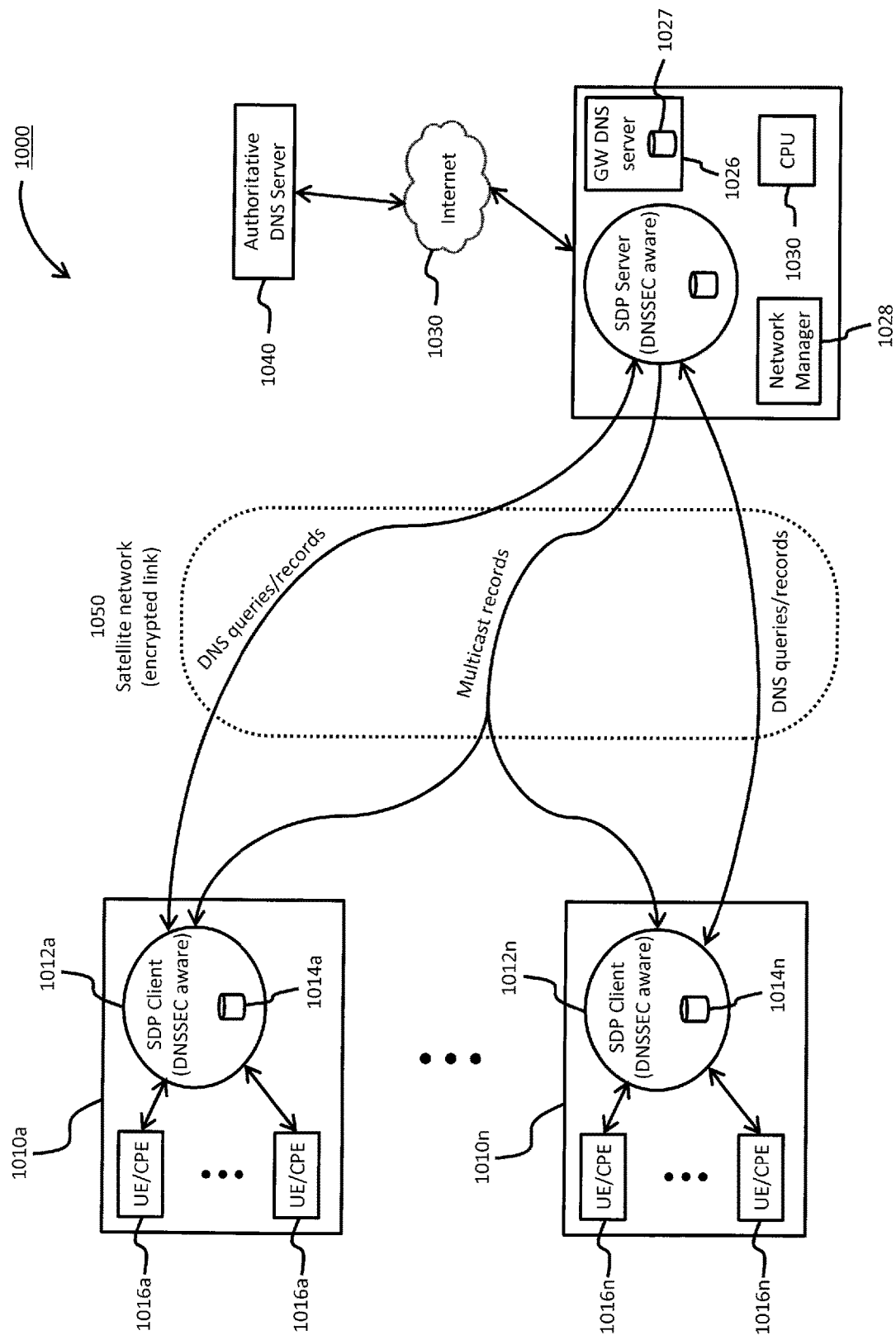
FIG. 10 is a diagram of a system capable of performing multicast operations in conjunction with a distributed secure DNS proxy, according to various embodiments.

FIG. 10 illustrates a system 1000 for performing multicast operations in accordance with various embodiments. The system 1000 includes a plurality of terminals 1010a to 1010n (collectively 1010) configured to establish communication with a gateway 1020 via a satellite network 1050. As illustrated in FIG. 1000, each terminal 1010 includes a respective SDP client 1012a-1012n, and supports communication with a plurality of CPE 1016a-1016n. Each SDP client 1012 further includes a respective storage unit 1014a-1014n. For example, terminal 1010a contains an SDP client 1012a having a storage unit 1014a therein. Terminal 1010a also supports communication from a plurality of CPEs 1016a. As can be appreciated, the type and number of CPE 1016 supported by each terminal 1010 will vary based on the particular customer need and number of devices (i.e., CPEs) being used. According to the illustrated embodiment, the SDP clients 1012 can optionally be configured to implement DNSSEC. The CPEs 1016a supported by SDP client 1012a, therefore, have the option to apply DNNSEC to DNS queries or submit DNS queries over an encrypted link using secure transport modes such as HTTPS, TLS, DTLS, etc.

The system 1000 also includes a gateway 1020 that can incorporate an SDP server 1022, a gateway DNS server 1026, a network manager 1028, and one or more CPU 356. Furthermore, the SDP server 1022 includes a storage unit 1024, and the gateway DNS server 1026 contains a storage unit 1027. According to the illustrated embodiment, the SDP server 1022 can be configured to implement DNSSEC protocols. Such a configuration allows the SDP server 1022 to transmit, receive, and process DNS queries using DNNSEC or secure transport modes. The gateway 1020 can also include various interfaces (not shown) for accessing external networks such as the internet 1030 in order to communicate with an authoritative DNS server 1040.

According to the illustrated embodiment, the SDP server 1022 receives DNS queries from a plurality of terminals 1010. Each terminal 1010 operates with a certain level autonomy to facilitate communication to/from its supported CPEs 1016. The terminals 1010 do not interact with each other directly, and therefore the SDP clients 1012 do not have access to information contained in the storage units 1014 of other SDP clients 1012. According to an embodiment, the SDP server 1022 can be configured to store copies of all authoritative records received from the authoritative DNS server 1040. The SDP server 1022 can be further configured to analyze authoritative records and DNS queries from all terminals 1010 supported by the gateway 1020. The SDP server 1022 can subsequently multicast some, or all, of the authoritative records contained within its storage unit 1024 to some, or all, of the supported terminals 1010. All terminals 1010 would subsequently contain the same updated records within their respective storage units 1014.

According to various embodiments, each individual terminal 1010 can independently analyze authoritative records and/or DNS queries received from its supported CPEs 1016 in order to identify any trends or patterns. For example, a particular SDP client 1012a may detect access to a particular webpage from one of the CPE 1016a at approximately the same time each 24-hour period (i.e., daily). Accordingly, the SDP client 1012a can conclude that a particular user will access the same website at approximately the same time on future days. The SDP server 1020 can also be configured to track all commonly received DNS queries, time of day received, etc. Upon receiving a multicast of authoritative records, each SDP client 1012 can selectively save some, or all, of the authoritative records contained in the multicast. Accordingly, each SDP client 1012 can maintain and process records more likely to resolve DNS queries received from its associated CPE 1016.

Figure 11:
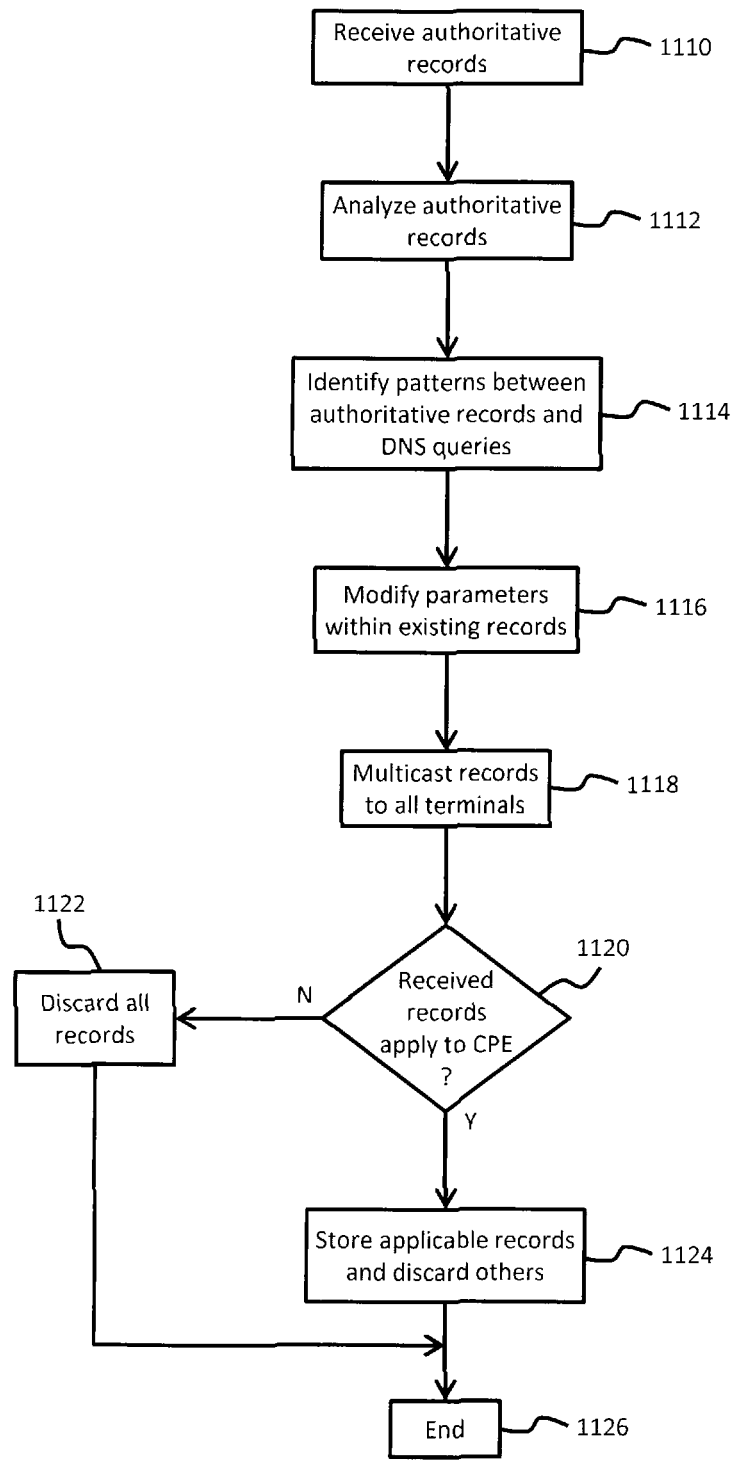
FIG. 11 is a flowchart of a process for performing multicast operations, according to one or more embodiments.

FIG. 11 illustrates a process for performing multicast operations, in accordance with one or more embodiments. At 1110, authoritative records are received at the SDP server. At 1112, the authoritative records are analyzed. Depending on the specific implementation, the analysis can be performed over a predetermined time period, continuously, etc. For example, the SDP server can be configured to analyze authoritative records that are supplied in response to DNS queries for a period of 1 hr., 2 hrs., 5 hrs., 10 hrs., 24 hrs., etc. The analysis can be performed, for example, using machine learning techniques, statistical inference algorithms, etc. At 1114, the SDP server identifies various patterns between the authoritative records and the corresponding DNS queries.

At 1116, one or more parameters from the records are modified based, in part, on the patterns that have been identified. For example, the SDP server may identify a particular domain (i.e., web address or address groups) as rarely changing its active IP address. Accordingly, the SDP server can modify the parameters of the record such that its status is identifiable as non-expired. Such a record would not need to be frequently updated in order to satisfy a received DNS query. The SDP server can also identify records with short expiration times, and ensure that they are updated at a higher frequency. At 1118, the records contained within the storage of the SDP server are multicast to all terminals supported by the gateway.

At 1120 each individual terminal receives a copy of the multicast records. The SDP client contained within each terminal analyzes the records in order to determine whether or not the included records apply to CPEs supported by the terminal. If any of the multicast records correspond to DNS queries routinely received from CPEs supported by the terminal, the applicable records are stored at 1124. More particularly, the SDP client can also monitor and analyze DNS queries and authoritative records in order to identify any patterns. Such information can be used, in part, to determine which multicast records should be stored or discarded. If none of the multicast records apply to CPE supported by the terminal, the SDP client can simply discard all of the records. The process ends at 1126.

Figure 12:
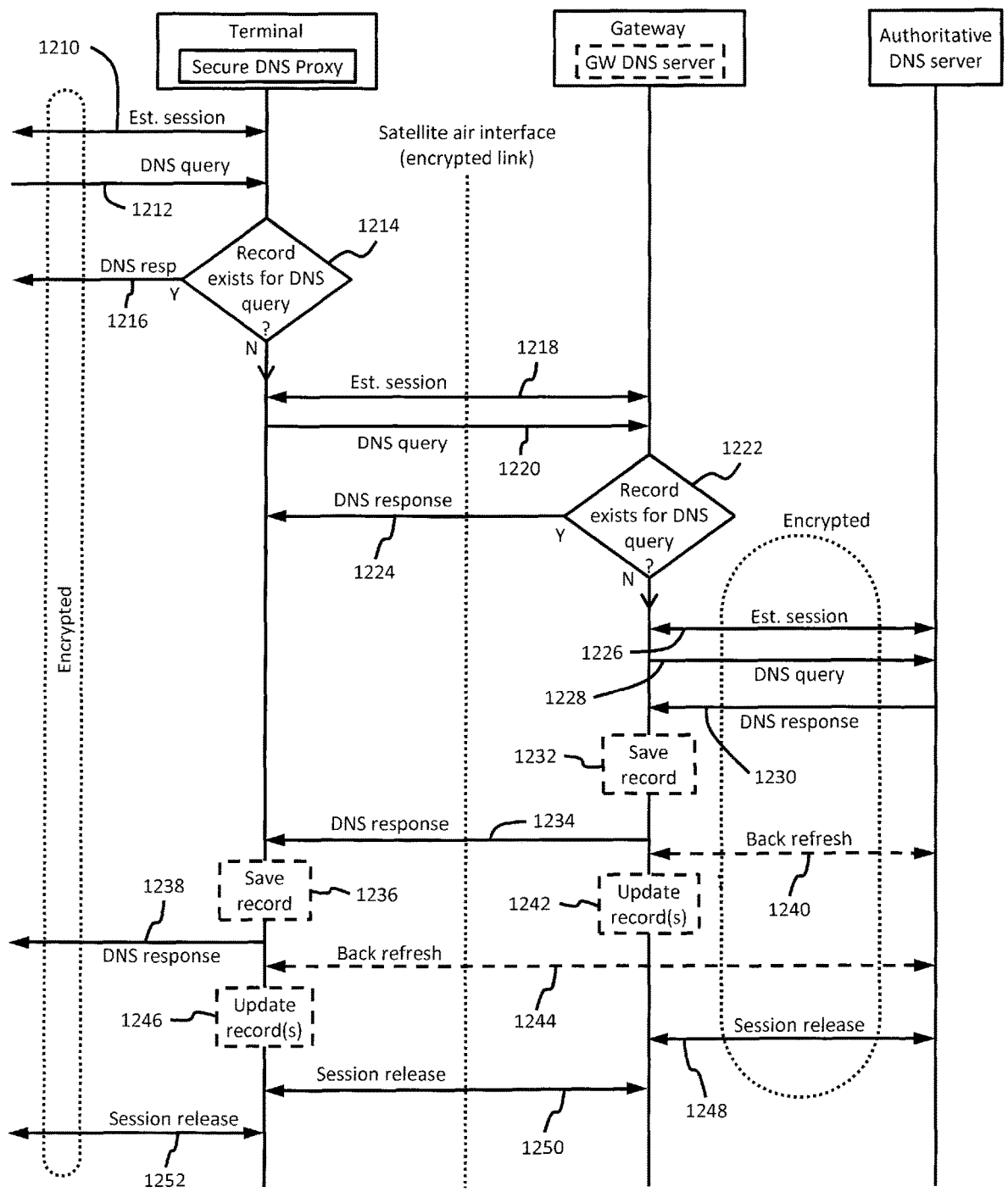
FIG. 12 is a ladder diagram illustrating DNS resolution in a system using a secure DNS proxy, according to one or more embodiments.

FIG. 12 illustrates resolution of a DNS query, in accordance one or more embodiments. At 1210, a secure communication session is established with the terminal. As previously discussed, the terminal can support various types of CPEs that require address translation. Depending on the specific protocol being used, the session can be established by performing various handshakes and exchanging information between the CPE and the terminal so that their respective identities can be confirmed. Furthermore, specific encryption protocols are established so that future transmissions between the CPE and the terminal are secure. Once the session has been established, the terminal receives a DNS query at 1212.

The terminal examines its storage unit in order to determine whether or not a valid record exists for the received DNS query. According to at least one embodiment, a valid record corresponds to a non-expired record which satisfies the DNS query. According to other embodiments, however, a record can be considered valid if prior analysis has been performed to extend its validity beyond the originally stated expiration time (i.e., time to live). As previously discussed, a secure session is established with the terminal so that all transmissions can be encrypted. Accordingly, the DNS query received by the SDP is encrypted. In order to determine the contents of the DNS query so that the storage unit can be searched, it is necessary for the SDP to decrypt the received DNS query. Since the secure session is established between the SDP and the CPE, the SDP has access to all the requisite information for decrypting the DNS query.

If a valid record is found in the storage of the SDP, it is returned in encrypted form as a response to the DNS query at 1216. If the storage of the SDP does not contain a valid record for the DNS query, then a communication session is established between the SDP and the gateway over the satellite link at 1218. It should be noted, however, that certain records may not exist altogether within the storage of the SDP. This can correspond to a situation where a particular domain has never been accessed by the CPE, or any existing records have expired and been purged from the storage.

According to at least one embodiment, the session established between the terminal and the gateway applies encryption protocols that are standard for all communication over the satellite link. Accordingly, it is not necessary for the SDP to re-encrypt the DNS query after decrypting it to search the storage unit. Such embodiments can advantageously reduce the overhead associated with the encryption established between the CPE and the SDP. If the session between the CPE and the terminal utilizes TLS encryption, for example, any overhead associated with encrypting packets that are transmitted over the satellite can be eliminated. Furthermore, security is not compromised because the standard layer-2/layer-3 encryption used by the satellite communication system is applied. Upon establishing the session with the gateway, the DNS query is forwarded to the gateway at 1220.

According to at least one embodiment, the gateway can include a gateway DNS server capable of processing the received query. According to such embodiments, the gateway DNS server would search its storage at 1222 in order to determine whether a valid gateway record exists. If a valid gateway record is found, it is returned to the terminal at 1224. As previously discussed, a valid gateway record can correspond to a non-expired record, a modified record, a record with acceptable expiration time, etc. If a valid gateway record is not found in the storage of the gateway DNS server, a communication session is established with an external authoritative DNS server at 1226. The session between the gateway and the authoritative DNS server can be established over public and/or private networks. Since the encryption previously applied over the satellite link is no longer available, new encryption protocols must be applied so that the DNS query can be transmitted in encrypted form. If the SDP re-encrypted the DNS query prior to transmitting to the gateway, no further encryption is required prior to sending to authoritative DNS server. According to embodiments where a gateway DNS server is not present, the communication session would be established between the gateway and the authoritative DNS server immediately at 1226.

At 1228, the DNS query is transmitted to the authoritative DNS server. Since all of the requisite parameters for a secure session have been established at 1226, the DNS query is transmitted in encrypted form. At 1230, the authoritative DNS server provides a response in the form of an authoritative record. Since an encrypted link had been established between the gateway and the authoritative DNS server, the authoritative record is received in encrypted form. According to at least one embodiment, a copy of the authoritative record can be saved in the storage of the gateway DNS server at 1232. This would allow the gateway DNS server to update its storage unit so that the record can be used to satisfy future DNS queries. The authoritative record can also be decrypted so that it can be stored in the storage of the gateway DNS server. At 1234, the authoritative record is transmitted to the terminal over the satellite link using the established satellite encryption protocols. At 1236, the SDP can optionally store a copy of the authoritative record in its storage unit in order to update any expired record or include a new record. The SDP subsequently encrypts the authoritative record in accordance with the parameters used at 1210 to establish the session with the CPE. The encrypted authoritative record is then returned at 1238 in response to the DNS query.

According to at least one embodiment, the gateway DNS server can periodically examine the status of records contained in its storage. If the gateway DNS server determines that any records have newly expired or are close to expiring, a back refresh can be performed at 1240. More particularly, the gateway DNS server can autonomously submit DNS queries for the identified records to the authoritative DNS server so that valid records can be available in the event a DNS query is received from one of the terminals. At 1242, all such records would be updated with authoritative records received from the authoritative DNS server as a result of the back refresh. According to further embodiments, the SDP can also monitor and analyze the status of records contained in its storage.

If the SDP determines that any records have expired or are close to expiring, then a communication session can be established with the authoritative DNS server in order to perform a back refresh at 1244. As previously discussed, various embodiments allow for the SDP and gateway DNS server to perform various analyses pertaining to received DNS queries and/or authoritative records. Such analyses can also result in conditions that require the SDP or gateway DNS server to perform a back refresh. At 1246, the expired or newly expired records identified in the storage of the SDP are updated with the newly received authoritative records. At 1248, the session between the gateway and the authoritative DNS server is terminated, or release. Similarly, a session release is initiated between the terminal and the gateway. Finally, the session between the CPE initiating the DNS query and the terminal is released at 1252. Although FIG. 12 illustrates all of the sessions being released, it should be noted that this is merely done for completeness in describing end-to-end resolution of the DNS query. In most circumstances, the sessions are cached and maintained for extended periods of time so that additional queries can be processes without having to re-establish the sessions.

Figure 13:
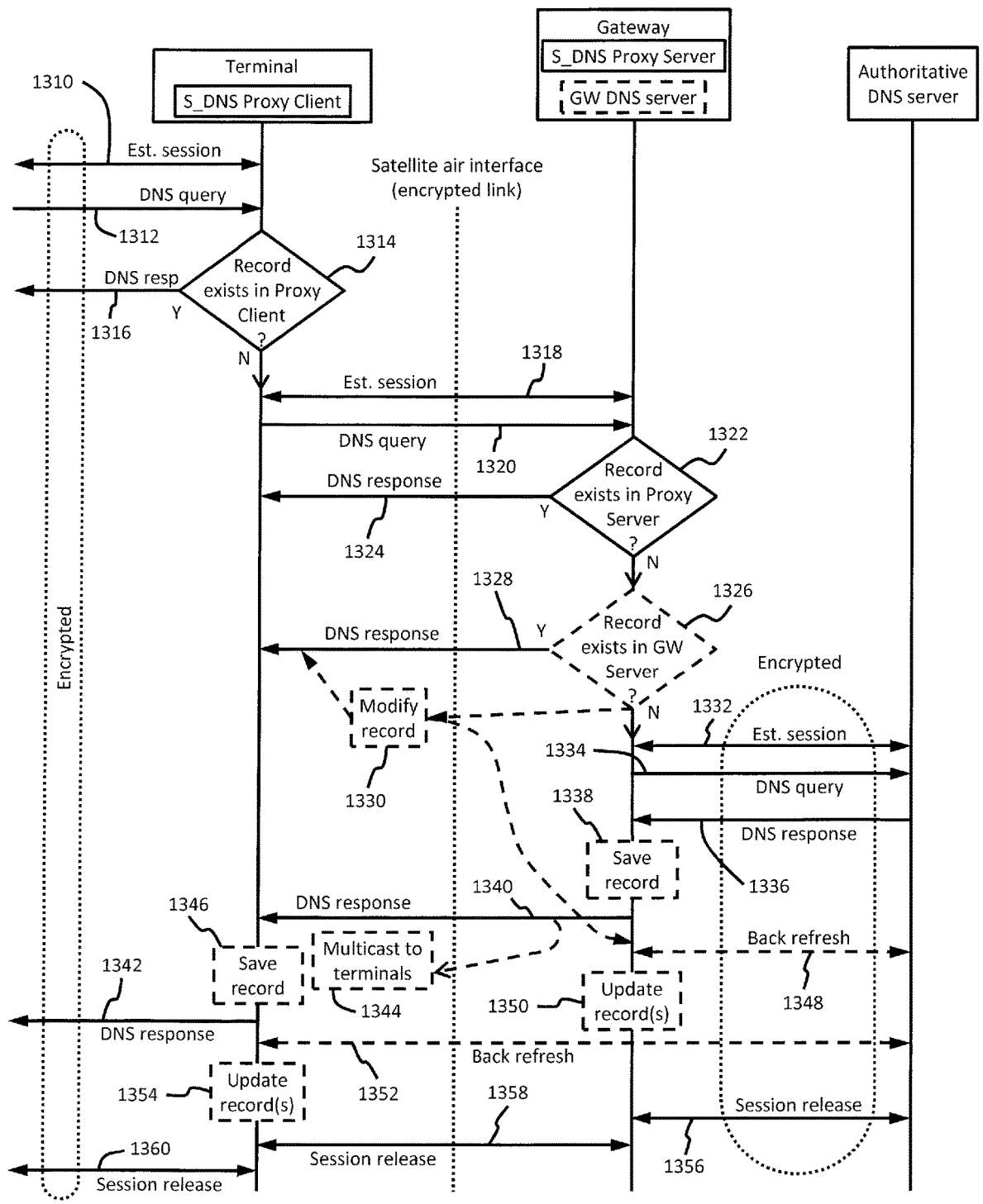
FIG. 13 is a ladder diagram illustrating DNS resolution in a system using a distributed secure DNS proxy, according to various embodiments.

FIG. 13 illustrates resolution of a DNS query using a distributed secure DNS proxy, in accordance with various embodiments. At 1310, a communication session is established between the SDP client and one of the CPE supported by the terminal. At 1312, a DNS query is received at the terminal and processed by the SDP client. As previously discussed, the session established between the terminal and CPE utilizes encrypted transport modes such as, for example, HTTPS, TLS, DTLS, etc.). Accordingly, when the DNS query is received in encrypted form, the SDP client must decrypt the DNS query in order to access its contents. At 1314, the SDP client conducts a search of its storage unit in order to determine if a valid record exists for the DNS query. As previously discussed, a valid record can take various forms. For example, a valid record can be a non-expired record which satisfies the DNS query, a record which has been expired less than a predetermined amount of time, etc. If a valid record is found, the SDP client encrypts the record and supplies a DNS response to the CPE in the form of a client record, at 1316.

If a valid record is not found in the storage of the SDP client, a communication session is established, at 1318, between the SDP client and the gateway via the satellite link. According to at least one embodiment, the SDP client does not apply the encryption parameters used for the session with the CPE to encrypt the DNS query prior to transmitting over the satellite link. Rather, the standard protocol utilized by the satellite network is applied when transmitting the DNS query at 1320. At 1322, the DNS query is processed by an SDP server within the gateway in order to search for a valid server record within its storage unit. According to embodiments where the SDP client further encrypts the DNS query prior to transmission over the satellite link, the SDP server would decrypt the DNS query prior to searching its storage unit. If a valid server record is found, it is returned to the terminal (and SDP client) via the satellite link at 1324. If a valid server record does not exist within the SDP server, control can optionally pass to 1326 or proceed to 1332.

According to various embodiments, the gateway can also include a gateway DNS server which also stores various records capable of being used to resolve DNS queries. According to such embodiments, the gateway DNS server would search its storage at 1326 in order to determine whether a valid gateway record exists. If a valid gateway record is found, it is transmitted to the SDP terminal at 1328. Depending on the specific implementation, the gateway record may be forwarded to the SDP server. The SDP server would then transmit the gateway record to the terminal. Furthermore, the SDP server could encrypt the gateway record if the DNS query was received in encrypted form.

According to at least one embodiment, if the gateway DNS server contains a gateway record that is expired or otherwise unusable, control can optionally pass to 1330. One or more parameters within the gateway record can be modified such that the status of the gateway record changes from expired to non-expired. Depending on the specific implementation and parameters used to identify the status of each record, the gateway record can be modified such that it status changes from invalid to valid. The modified gateway record would then be forwarded to the SDP client over the satellite link, or optionally via the SDP server. Additionally, control can immediately jump to 1348 so that a back refresh to be performed to update the status of the modified gateway record.

Returning to 1326, if a valid gateway record is not found, a communication session is established with an authoritative DNS server at 1332. According to various embodiments, the DNS query would be encrypted using the parameters selected while establishing the communication session with the authoritative DNS server. At 1334, the DNS query is submitted to the authoritative DNS server. At 1336, an authoritative record is received at the gateway from the authoritative DNS server. According to at least one embodiment, a copy of the authoritative record can be saved in the SDP server and/or gateway DNS server. This occurs at 1338. At 1340, a DNS response (i.e., the authoritative record) is forwarded to the terminal which submitted the DNS query. According to the illustrated embodiment, the DNS response supplied to the terminal can be a server record, gateway record, or an authoritative record, depending on which entity successfully resolves the DNS query. Furthermore, if a gateway record was supplied to the terminal at 1328, it could be in the form of a modified record. Although FIG. 13 illustrates the gateway DNS server performing modifications to one of its records, it should be noted that the SDP server and SDP client can also be configured to modify various records depending on the specific situations and/or implementations.

According to various embodiments, the SDP server and/or gateway DNS server can perform various types of analyses on DNS queries, authoritative records, etc. Such analyses can result in identification of different patterns for DNS queries received from different terminals supported by the gateway as well as authoritative records received from the authoritative DNS server. Based on one or more analyses, a list of records can be compiled and multicast to all terminals supported by the gateway. This is done at 1344. Thus, the terminal initiating the DNS query would receive the DNS response at either 1324, 1328, or 1340, as well as the multicast list of records sent to all terminals supported by the gateway at 1344.

At 1342, the SDP client supplies the DNS response (either client record, server record, gateway record, or authoritative record) to the CPE in response to the DNS query. According to various embodiments, the SDP client can save a copy of any received records within its storage unit. Furthermore, the SDP client can save at least a portion of the multicast list from the gateway within its storage unit. For example, the SDP client can monitor DNS queries and records supplied to satisfy the DNS query, and perform its own analyses. Based on such analyses, the SDP client can selectively identify which records from the multicast list should be saved in its storage. For example, if the SDP client performs an analysis and determines that none of its supported CPE has submitted a DNS query for a particular address, then a record from the multicast list satisfying such a DNS query can be omitted from the storage unit in order to save space and time required to search for records. Furthermore, such analyses can be performed by all terminals receiving the multicast list in order to optimize storage space and search times.

At 1348, the gateway DNS server and/or SDP server can initiate a back refresh to update any expired or nearly expired records contained within their storages. As previously discussed, the SDP server and gateway DNS server can monitor the status of records stored in their respective storage units either continuously or at preset intervals (e.g., 5, 10, 30, 60, 90 minutes, etc.). The records would subsequently be updated at 1350. Depending on the specific implementation, only the records of the entity initiating the back refresh (e.g., the SDP server or gateway DNS server) would be updated with the authoritative records. For example, if the SDP server initiates the back refresh, only records contained in the SDP server would be updated with authoritative records received from the authoritative DNS server. According to other embodiments, however, the records of both the SDP server and the gateway DNS server can be updated regardless of which one initiated the back refresh. Additional implementations also provide for transmitting the results of the back refresh to the SDP client, or multicasting the results to all terminals supported by the gateway.

At 1352, the SDP client can similarly initiate a back refresh to update any records that are expired or nearly expired. At 1354, the SDP client would update its records with authoritative records received from the authoritative DNS server. At 1356, the session between the gateway and the authoritative DNS server is terminated (or released). At 1358, the session between the terminal and the gateway is terminated. Finally, the session between the terminal and the CPE is terminated at 1360.

Figure 14:
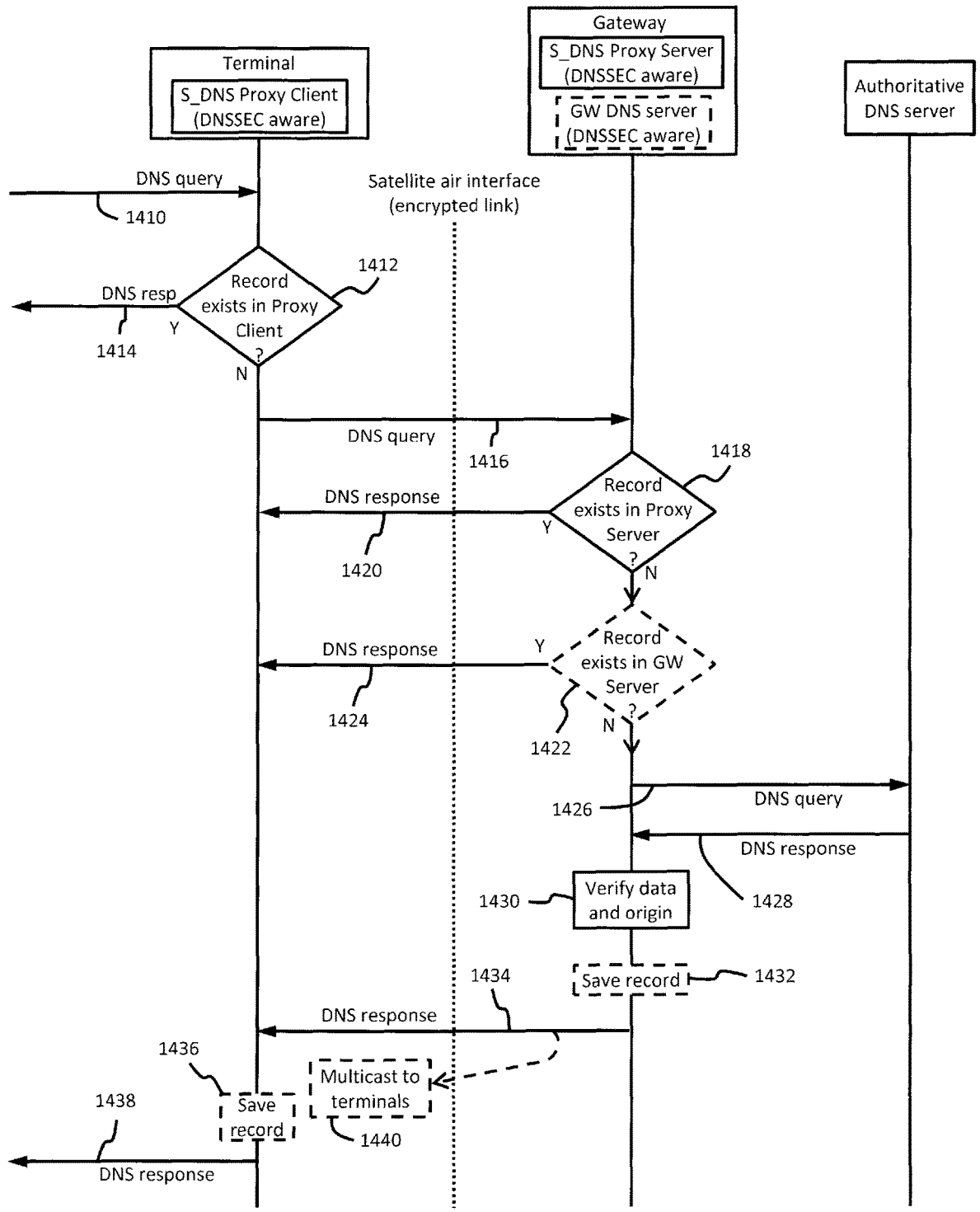
FIG. 14 is a ladder diagram illustrating DNS resolution in a system using a secure DNSSEC-aware proxy, according to at least one embodiment.

FIG. 14 illustrates resolution of a DNS query using DNSSEC protocols, in accordance with at least one embodiment. At 1410, a DNS query is submitted to the terminal. According to the illustrated embodiment, the DNS query is compatible with DNSSEC protocols (or specifications). As previously discussed, DNSSEC protocols provide a layer of security with by facilitating detection of any alteration to contents of the authoritative record associated with the DNS query. While the contents cannot be altered, however, they can still be viewed. Accordingly, at 1412, a DNSSEC-aware SDP client examines the contents of the DNS query. The DNSSEC-aware SDP client would search its storage unit in order to determine whether or not a valid record exists for the DNS query. If a valid record is found, it is supplied to the CPE at 1414. Since the records in the storage unit of the DNSSEC-aware SDP client are also digitally signed using DNSSEC protocols, they cannot be modified. Accordingly, it is not possible modify any of the parameters in these records to change the status of such records have expired. Various embodiments, however, allow the DNSSEC-aware SDP client to supply expired records to the CPE. As previously discussed, the SDP client can be configured to analyze patterns associated with DNS queries, authoritative records, etc. Such analysis can be the basis for supplying an expired record despite the use of DNSSEC protocols, if the DNSSEC-aware SDP client determines that the IP address associated with the record is unlikely to change prior to its use by the CPE.

If a valid (or non-expired) record is not available in the storage unit of the DNSSEC-aware SDP client, then at 1416, the DNS query is submitted to the DNSSEC-aware SDP server. At 1418, the DNSSEC-aware SDP server examines the contents of the DNS query and conducts a search of its storage in order to determine if a valid and non-expired record exists for the DNS query. If a valid and non-expired record is found, it is returned to the DNSSEC-aware SDP client at 1420. Such a record would correspond to a previously stored authoritative record that is digitally signed. According to embodiments where the gateway includes a gateway DNS server, control can pass to 1422. The gateway DNS server is configured to be DNSSEC-aware in order to detect use of such protocols and access the parameters contained within the DNS query. The gateway DNS server would then search its storage in order to determine whether or not a valid and non-expired record exists. Such a record would correspond to a previously stored authoritative record that is digitally signed. If a valid and non-expired record is found, it is returned to the DNSSEC-aware SDP client at 1424.

If a valid and non-expired record is not found, or if the gateway does not include a gateway DNS server, then at 1426, the DNS query is submitted to the authoritative DNS server. At 1428, the authoritative DNS server returns a digitally signed authoritative record. Since certain information can be accessed from the DNS query, the data and origin of the authoritative record can be verified by either the DNSSEC-aware SDP server or the gateway DNS server at 1430. At 1432, the authoritative record can be saved in the storage of the DNSSEC-aware SDP server, the gateway DNS server, or both. At 1434, the authoritative record is returned to the DNSSEC-aware SDP client. At 1436, the DNSSEC-aware SDP client can optionally save a copy of the authoritative record within its storage unit. Alternatively, the DNSSEC-aware SDP client can supply the record to the CPE at 1438, without saving a copy thereof.

According to various embodiments, the DNSSEC-aware SDP server and/or the gateway DNS server can perform various analyses to detect patterns associated with DNS queries, authoritative records, time of day, specific terminals, etc. Based on this analysis, a list of records can be generated and multicast to all terminals supported by the gateway at 1446. Furthermore, various implementations allow for individual terminals to perform additional analyses resulting in only a portion of the multicast list or the entire multicast list to be saved within their respective storage units.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described receivers, transmitters, transceivers, gateway, network manager, gateway DNS server, secure DNS proxy server, terminals, configuration handler, satellite network transport, crypto store, secure DNS proxy, secure DNS proxy client, DNSSEC-aware SDP client/server, etc. Additionally, such hardware can be interfaced to connect and/or facilitate communication between different components such as the SDP client and the crypto store, SDP server and gateway DNS server, etc.

Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 15:
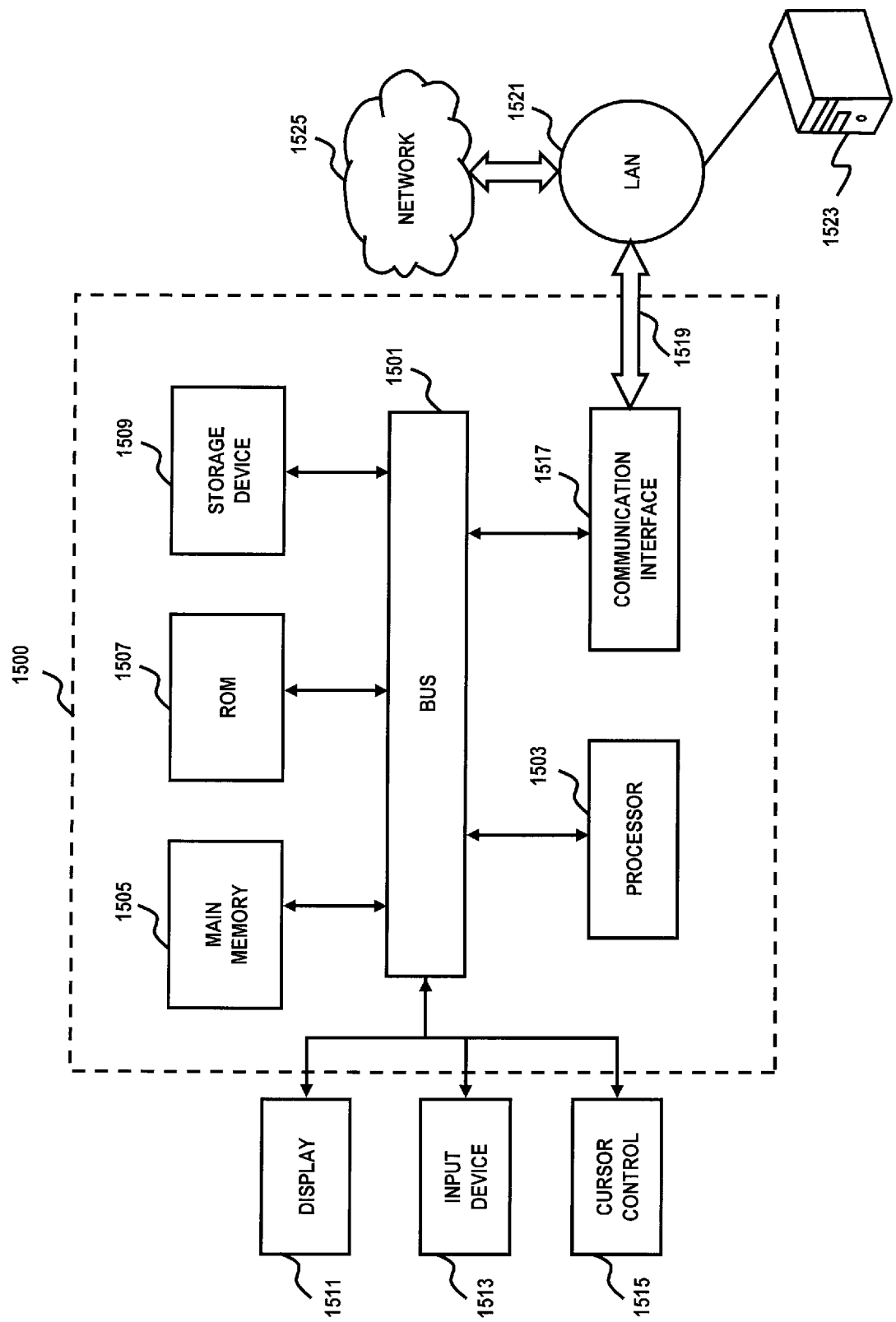
FIG. 15 is a diagram of a computer system that can be used to implement various exemplary features and embodiments.

FIG. 15 is a diagram of a computer system that can be used to implement features of various embodiments. The computer system 1500 includes a bus 1501 or other communication mechanism for communicating information and a processor 1503 coupled to the bus 1501 for processing information. The computer system 1500 also includes main memory 1505, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 1501 for storing information and instructions to be executed by the processor 1503. Main memory 1505 can also be used for storing temporary variables or other intermediate information during execution of instructions by the processor 1503. The computer system 1500 may further include a read only memory (ROM) 1507 or other static storage device coupled to the bus 1501 for storing static information and instructions for the processor 1503. A storage device 1509, such as a magnetic disk or optical disk, is coupled to the bus 1501 for persistently storing information and instructions.

The computer system 1500 may be coupled via the bus 1501 to a display 1511, such as a light emitting diode (LED) or other flat panel displays, for displaying information to a computer user. An input device 1513, such as a keyboard including alphanumeric and other keys, is coupled to the bus 1501 for communicating information and command selections to the processor 1503. Another type of user input device is a cursor control 1515, such as a mouse, a trackball, or cursor direction keys, for communicating direction information and command selections to the processor 1503 and for controlling cursor movement on the display 1511. Additionally, the display 1511 can be touch enabled (i.e., capacitive or resistive) in order facilitate user input via touch or gestures.

According to an exemplary embodiment, the processes described herein are performed by the computer system 1500, in response to the processor 1503 executing an arrangement of instructions contained in main memory 1505. Such instructions can be read into main memory 1505 from another computer-readable medium, such as the storage device 1509. Execution of the arrangement of instructions contained in main memory 1505 causes the processor 1503 to perform the process steps described herein. One or more processors in a multi-processing arrangement may also be employed to execute the instructions contained in main memory 1505. In alternative embodiments, hard-wired circuitry may be used in place of or in combination with software instructions to implement exemplary embodiments. Thus, exemplary embodiments are not limited to any specific combination of hardware circuitry and software.

The computer system 1500 also includes a communication interface 1517 coupled to bus 1501. The communication interface 1517 provides a two-way data communication coupling to a network link 1519 connected to a local network 1521. For example, the communication interface 1517 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1517 sends and receives electrical, electromagnetic, or optical signals that carry digital data streams representing various types of information. Further, the communication interface 1517 can include peripheral interface devices, such as a Universal Serial Bus (USB) interface, a High Definition Multimedia Interface (HDMI), etc. Although a single communication interface 1517 is depicted in FIG. 15, multiple communication interfaces can also be employed.

The network link 1519 typically provides data communication through one or more networks to other data devices. For example, the network link 1519 may provide a connection through local network 1521 to a host computer 1523, which has connectivity to a network 1525 such as a wide area network (WAN) or the Internet. The local network 1521 and the network 1525 both use electrical, electromagnetic, or optical signals to convey information and instructions.

The signals through the various networks and the signals on the network link 1519 and through the communication interface 1517, which communicate digital data with the computer system 1500, are exemplary forms of carrier waves bearing the information and instructions.

The computer system 1500 can send messages and receive data, including program code, through the network(s), the network link 1519, and the communication interface 1517. In the Internet example, a server (not shown) might transmit requested code belonging to an application program for implementing an exemplary embodiment through the network 1525, the local network 1521 and the communication interface 1517. The processor 1503 may execute the transmitted code while being received and/or store the code in the storage device 1509, or other non-volatile storage for later execution. In this manner, the computer system 1500 may obtain application code in the form of a carrier wave.

The term "computer-readable medium" as used herein refers to any medium that participates in providing instructions to the processor 1503 for execution. Such a medium may take many forms, including but not limited to non-volatile media, volatile media, and transmission media. Non-volatile media include, for example, optical or magnetic disks, such as the storage device 1509. Non-volatile media can further include flash drives, USB drives, microSD cards, etc. Volatile media include dynamic memory, such as main memory 1505. Transmission media include coaxial cables, copper wire and fiber optics, including the wires that comprise the bus 1501. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

FIG. 16 illustrates a chip set 1600 upon which features of various embodiments may be implemented. Chip set 1600 is programmed to implement various features as described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1600, or a portion thereof, constitutes a means for performing one or more steps of the figures.

In one embodiment, the chip set 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1603 and accompanying components have connectivity to the memory 1605 via the bus 1601. The memory 1605 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 1605 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    receiving a domain name system (DNS) query at a secure DNS proxy (SDP) of a satellite communication system, the DNS query being encrypted using a predetermined security protocol;
    decrypting the DNS query;
    determining if a non-expired record exists for the DNS query in a storage of the SDP;
    determining if an expired record exists for the DNS query in the storage of the SDP;
    modifying at least one parameter in the expired record to change its status to non-expired;
    supplying an encrypted copy of the record from the SDP storage in response to the received query, if the record is not expired;
    encrypting the DNS query;
    submitting the encrypted DNS query to an authoritative DNS server via a public network, if the record is expired or does not exist in the storage of the SDP;
    receiving an encrypted authoritative record in response to the submitted DNS query;
    decrypting the authoritative record;
    applying the predetermined security protocol to encrypt the authoritative record; and
    supplying the authoritative record, encrypted with the predetermined security protocol, in response to the received DNS query.
2. The method of claim 1, further comprising storing a copy of the authoritative record in the storage of the SDP.
3. The method of claim 1, further comprising performing a back refresh at predetermined time intervals to update records contained in the storage of the SDP.
4. The method of claim 1, wherein the DNS query is encrypted using at least one of Transport Layer Security (TLS), Datagram Transport Layer Security (DTLS), Hypertext Transfer Protocol Secure (HTTPS), and QUIC.
5. The method of claim 1, wherein the SDP is located within a terminal of the satellite communication system, a gateway of the satellite communication system, or both.
6. The method of claim 1, further comprising:
    monitoring contents of authoritative records, by the SDP, to identify patterns between the authoritative records and the DNS queries; and
    modifying one or more parameters of records contained in the storage of the SDP based, at least in part, on the identified patterns.
7. The method of claim 6, wherein the one or more parameters include at least a type, class, time to live (TTL), and/or resource data.
8. The method of claim 1, further comprising:
    monitoring the storage of the SDP to identify records that are nearly expired or expired; and
    performing a back refresh to update the identified records.
9. The method of claim 8, wherein monitoring further comprises:
    determining if an expiration time of the identified records is less than a predetermined threshold; and
    supplying the identified records in response to received queries, if the expiration time is less than the predetermined threshold,
    wherein at least one parameter in the one identified record is modified prior to being supplied in response to the query.
10. The method of claim 1, wherein:
    the SDP is located within a terminal in the satellite communication system; and
    receiving a DNS query comprises receiving a DNS query, at the terminal, from a customer premise equipment (CPE).
11. The method of claim 10, wherein:
    determining if a non-expired record exists further comprises forwarding the DNS query to a gateway of the satellite communication system, if the record does not exist in the storage of the SDP;
    the gateway encrypts and submits the DNS query to the authoritative DNS server; and
    receiving an encrypted authoritative record further comprises transmitting the encrypted authoritative record from the gateway to the terminal.
12. The method of claim 11, wherein:
    the DNS query is forwarded from the SDP to the gateway over an encrypted satellite link; and
    the authoritative record is transmitted from the gateway to the SDP over the encrypted satellite link.
13. The method of claim 12, further comprising:
    decrypting the DNS query, by the SDP, prior to forwarding to the gateway; and
    decrypting the authoritative record, at the gateway, prior to transmitting to the SDP.
14. The method of claim 11, wherein forwarding the DNS query further comprises:
    determining if a gateway record exists for the DNS query in a secure DNS server at the gateway;
    determining if the gateway record is expired; and
    transmitting the gateway record to the SDP, if the gateway record is not expired,
    wherein the SDP supplies an encrypted copy of the gateway record in response to the received DNS query.
15. The method of claim 14, wherein determining if the gateway record is expired further comprises modifying at least one parameter in an expired record to change its status to non-expired.

16. The method of claim 14, further comprising:
  monitoring the secure DNS server to identify gateway records that are nearly expired or expired; and
  performing a back refresh to update the identified gateway records.

17. The method of claim 14, wherein submitting the encrypted DNS query comprises submitting the DNS query to an authoritative DNS server via a public network, if the gateway record does not exist and/or the gateway record is expired.

18. The method of claim 17, further comprising:
  monitoring contents of authoritative records, by the secure DNS server to identify patterns between authoritative records and the DNS queries; and
  modifying one or more parameters of gateway records contained in the secure DNS server based, at least in part, on the identified patterns.

19. A method comprising:
  receiving a domain name system (DNS) query at a secure DNS proxy (SDP) client of a satellite communication system, the DNS query being encrypted using a predetermined security protocol;
  decrypting the DNS query;
  determining if a non-expired client record exists for the DNS query in a storage of the SDP client;
  determining if an expired record exists for the DNS query in the storage of the SDP;
  modifying at least one parameter in the expired record to change its status to non-expired;
  supplying an encrypted copy of the client record from the storage of the SDP client in response to the received query, if the client record is not expired;
  forwarding the DNS query to an SDP server located in a gateway of the satellite communication system, if the client record is expired or does not exist in the storage of the SDP client;
  determining if a non-expired server record exists for the DNS query in a storage of the SDP server;
  supplying an encrypted copy of the server record from the storage of the SDP server in response to the received query, if the server record is not expired;
  encrypting and submitting the DNS query to an authoritative DNS server via a public network, if the server record is expired or does not exist in the SDP server;
  receiving an encrypted authoritative record in response to the submitted DNS query;
  decrypting the authoritative record;
  applying the predetermined security protocol to encrypt the authoritative record; and
  supplying the authoritative record, encrypted with the predetermined security protocol, in response to the received DNS query.

20. The method of claim 19, wherein:
  the client records are saved in the storage of the SDP client based, at least in part, on received DNS queries; and
  the server records are saved in the storage of the SDP server based, at least in part, on forwarded DNS queries from all SDP clients supported by the SDP server.

21. The method of claim 19, further comprising performing a back refresh at predetermined time intervals to update records contained in the storage of the SDP client and/or the storage of the SDP server.

22. The method of claim 19, wherein the DNS query is encrypted using at least one of TLS, DTLS, HTTPS, and QUIC.

23. The method of claim 19, further comprising multicasting server records stored in the SDP server to all SDP clients at predetermined time intervals.

24. The method of claim 23, wherein the server records are multicast based on at least one of traffic demand for individual SDP clients, time zone of the SDP clients, frequently used DNS queries, and traffic demand for all SDP clients supported by the SDP server.

25. The method of claim 23, further comprising:
  monitoring, by the SDP server, content of DNS queries forwarded from all SDP clients;
  detecting patterns in the content of forwarded DNS queries;
  generating a list of server records corresponding to frequently used DNS queries; and
  multicasting the list of server records to all SDP clients.

26. The method of claim 25, further comprising:
  analyzing, by one or more SDP clients, the contents of received DNS queries to identify patterns between authoritative records and the DNS queries; and
  selecting, by the one or more SDP clients, server records contained in the multicast list for storage based, at least in part, on the analysis.

27. The method of claim 25, further comprising modifying one or more parameters of server records contained in the storage of the SDP server based, at least in part, on the detected patterns.

28. The method of claim 27, wherein modifying one or more parameters of server records results in a change in the server records' status from expired to non-expired.

29. The method of claim 27, wherein the one or more parameters include type, class, time to live (TTL), and/or resource data.

30. The method of claim 19, further comprising:
  monitoring the storage of the SDP client and the storage of the SDP server to identify client records and server records that are nearly expired or expired; and
  performing a back refresh to update the identified client records and server records.

31. The method of claim 30, wherein monitoring further comprises:
  determining if an expiration time of the identified client records and server records is less than a predetermined threshold; and
  supplying one of the identified client records or server records in response to a received query, if the expiration time is less than the predetermined threshold,
  wherein at least one parameter in the one identified client record or server record is modified prior to being supplied in response to the query.

32. The method of claim 19 wherein:
  the DNS query is forwarded to the SDP server from the SDP client over an encrypted satellite link; and
  the authoritative record is transmitted to the SDP client from the SDP sever over the encrypted satellite link.

33. The method of claim 32, further comprising:
  decrypting the DNS query prior to forwarding to the SDP server; and
  decrypting the authoritative record prior to transmitting to the SDP client.

34. The method of claim 19, wherein forwarding the DNS query further comprises:
  determining if a gateway record exists for the DNS query in a secure DNS server at the gateway;
  determining if the gateway record is expired; and
  transmitting the gateway record to the SDP client, if the gateway record is not expired, wherein the SDP client supplies an encrypted copy of the gateway record in response to the received DNS query.

35. The method of claim 34, further comprising:
monitoring the secure DNS server to identify gateway records that are nearly expired or expired; and
performing a back refresh to update gateway records that are nearly expired or expired.

36. The method of claim 34, wherein determining if the gateway record is expired further comprises modifying at least one parameter in the expired gateway record to change its status to non-expired.

37. The method of claim 34, wherein submitting the DNS query comprises encrypting and submitting the DNS query to an authoritative DNS server via a public network, if the gateway record does not exist and/or the gateway record is expired.

38. The method of claim 34, further comprising:
monitoring authoritative records at the secure DNS server to identify patterns between authoritative records and the DNS queries; and
modifying one or more parameters of gateway records contained in the secure DNS server based, at least in part, on the identified patterns.

39. A method comprising:
receiving a domain name system (DNS) query at a secure DNS proxy (SDP) client of a satellite communication system, the SDP client being domain name system security extensions (DNSSEC) aware;
determining if a non-expired client record exists for the DNS query in a storage of the SDP client, the client record being digitally signed;
supplying the client record from the SDP client in response to the received query, if the client record is not expired;
forwarding the DNS query to an SDP server located in a gateway of the satellite communication system, if the client record is expired or does not exist in the SDP client, the SDP server being DNSSEC-aware;
determining if a non-expired server record exists for the DNS query in a storage of the SDP server, the server record being digitally signed;
supplying the server record from the storage of the SDP server in response to the received query, if the server record is not expired;
submitting the DNS query to an authoritative DNS server via a public network, if the server record is expired or does not exist in the SDP server;
receiving an authoritative record digitally signed by the authoritative DNS server in response to the submitted DNS query;
verifying at least a source and/or authenticity of the authoritative record; and
supplying the authoritative record in response to the received DNS query based, at least in part, on the verifying.

40. The method of claim 39, further comprising:
saving client records in the storage of the SDP client based, at least in part, on received DNS queries; and
saving server records in the storage of the SDP server based, at least in part, on forwarded DNS queries from all SDP clients supported by the SDP server.

41. The method of claim 39, wherein an expired client record exists for the DNS query in the storage of the SDP client or the storage of the SDP server, and further comprising:
analyzing contents of DNS queries and authoritative records, by the SDP client and/or the SDP server; and
supplying the expired record from the storage of the SDP client or the storage of the SDP server in response to the DNS query based, at least in part, on the analysis.

42. The method of claim 39, further comprising multicasting server records stored in the SDP server to all SDP clients at predetermined time intervals.

43. The method of claim 42, wherein the server records stored in the SDP server are multicast based on at least one of traffic demand for individual SDP clients, time zone of the SDP clients, frequently used domains, and traffic demand for all SDP clients supported by the SDP server.

44. The method of claim 43, further comprising:
monitoring, by the SDP server, content of DNS queries forwarded from all SDP clients;
detecting patterns in the content of forwarded DNS queries;
generating a list of server records corresponding to frequently used DNS queries; and
multicasting the list of server records to all SDP clients.

45. The method of claim 44, further comprising:
analyzing, by one or more SDP clients, the contents of received DNS queries to identify patterns between authoritative records and the DNS queries; and
selecting, by the one or more SDP clients, server records contained in the multicast list for storage based, at least in part, on the analysis.

* * * * *